US009106835B2

(12) United States Patent
Kanma et al.

(10) Patent No.: US 9,106,835 B2
(45) Date of Patent: Aug. 11, 2015

(54) IMAGING DEVICE, AZIMUTH INFORMATION PROCESSING METHOD AND PROGRAM

(75) Inventors: Hiroshi Kanma, Kanagawa (JP); Ryunosuke Oda, Tokyo (JP); Takuma Nishikawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 214 days.

(21) Appl. No.: 13/515,300

(22) PCT Filed: Sep. 8, 2010

(86) PCT No.: PCT/JP2010/065424
§ 371 (c)(1),
(2), (4) Date: Sep. 20, 2012

(87) PCT Pub. No.: WO2011/077788
PCT Pub. Date: Jun. 30, 2011

(65) Prior Publication Data
US 2013/0002923 A1  Jan. 3, 2013

(30) Foreign Application Priority Data

Dec. 22, 2009 (JP) .................................. 2009-290695

(51) Int. Cl.
*H04N 5/232* (2006.01)
*G01C 17/28* (2006.01)
*G01C 17/38* (2006.01)

(52) U.S. Cl.
CPC ............ *H04N 5/23293* (2013.01); *G01C 17/28* (2013.01); *G01C 17/38* (2013.01)

(58) Field of Classification Search
CPC .... G01C 17/28; G01C 17/38; H04N 5/23293; H04N 5/2628; H04N 2201/3256; H04N 2201/3254; H04N 2201/3252
USPC .............................. 348/333.02, 135–137, 141, 348/208.99–208.16, 222.1, 369, 373–376
See application file for complete search history.

(56) References Cited

U.S. PATENT DOCUMENTS 7,027,823 B2 * 4/2006 Mikuni .......................... 455/457
7,436,434 B2 * 10/2008 Shibutani ................. 348/207.99
(Continued)

FOREIGN PATENT DOCUMENTS

CN  1755326 A  4/2006
EP  1 790 942 A1  5/2007
(Continued)

OTHER PUBLICATIONS

Japanese Office Action Issued May 21, 2013 in Patent Application No. 2009-290695.

(Continued)

*Primary Examiner* — Pritham Prabhakher
(74) *Attorney, Agent, or Firm* — Oblon, McClelland, Maier & Neustadt, L.L.P.

(57) ABSTRACT

Even when a posture of an imaging device changes, the imaging device can display a compass image in a natural mode when seen from a user's viewpoint and record a correct image capturing azimuth. Provided is an imaging device including: an image capturing unit which captures an image of a subject and outputs the captured image; an azimuth calculating unit which calculates an azimuth of the image capturing unit in an image capturing direction, based on geomagnetism information detected by a geomagnetic sensor and acceleration information detected by an acceleration sensor; an azimuth converting unit which calculates a rotation angle of the imaging device in a roll direction, based on the acceleration information, and converts the azimuth in the image capturing direction into a display azimuth based on the rotation angle in the roll direction; a display unit which displays a compass image representing the display azimuth and the captured image; and a recording unit which associates azimuth information representing the azimuth in the image capturing direction, with the captured image to record in a recording medium.

10 Claims, 11 Drawing Sheets

(56) References Cited

U.S. PATENT DOCUMENTS

| | | | |
|---|---|---|---|
| 7,450,839 B2* | 11/2008 | Lee et al. | 396/322 |
| 7,809,505 B2* | 10/2010 | Lee et al. | 701/508 |
| 8,065,083 B2* | 11/2011 | Sato et al. | 701/530 |
| 2003/0032436 A1* | 2/2003 | Mikuni | 455/457 |
| 2003/0122945 A1 | 7/2003 | Muramatsu | |
| 2003/0134665 A1* | 7/2003 | Kato et al. | 455/566 |
| 2003/0231243 A1* | 12/2003 | Shibutani | 348/207.99 |
| 2005/0044737 A1* | 3/2005 | Choi et al. | 33/356 |
| 2006/0010699 A1* | 1/2006 | Tamura | 33/355 R |
| 2006/0031014 A1* | 2/2006 | Sato et al. | 701/224 |
| 2006/0039693 A1* | 2/2006 | Lee et al. | 396/322 |
| 2006/0074549 A1 | 4/2006 | Takahashi et al. | |
| 2009/0225161 A1* | 9/2009 | Otani et al. | 348/135 |
| 2010/0002015 A1* | 1/2010 | Handa | 345/650 |

FOREIGN PATENT DOCUMENTS

| | | | |
|---|---|---|---|
| JP | 2004 080740 | | 3/2004 |
| JP | 2004-80740 A | | 3/2004 |
| JP | 2006-105640 A | | 4/2006 |
| JP | 3 781 016 | | 5/2006 |
| JP | 2009 159279 | | 7/2009 |
| JP | 2009-159279 A | | 7/2009 |
| JP | 2010 14540 | | 1/2010 |

OTHER PUBLICATIONS

U.S. Appl. No. 13/517,369, filed Jun. 20, 2012, Kanma, et al.
Combined Chinese Office Action and Search Report issued Jul. 3, 2014 in Patent Application No. 201080063925.0 (with English language translation).
International Search Report Issued Oct. 19, 2010 in PCT/JP10/65424 Filed Sep. 8, 2010.
Extended European Search Report issued Mar. 9, 2015 in Patent Application No. 10839025.3.

* cited by examiner

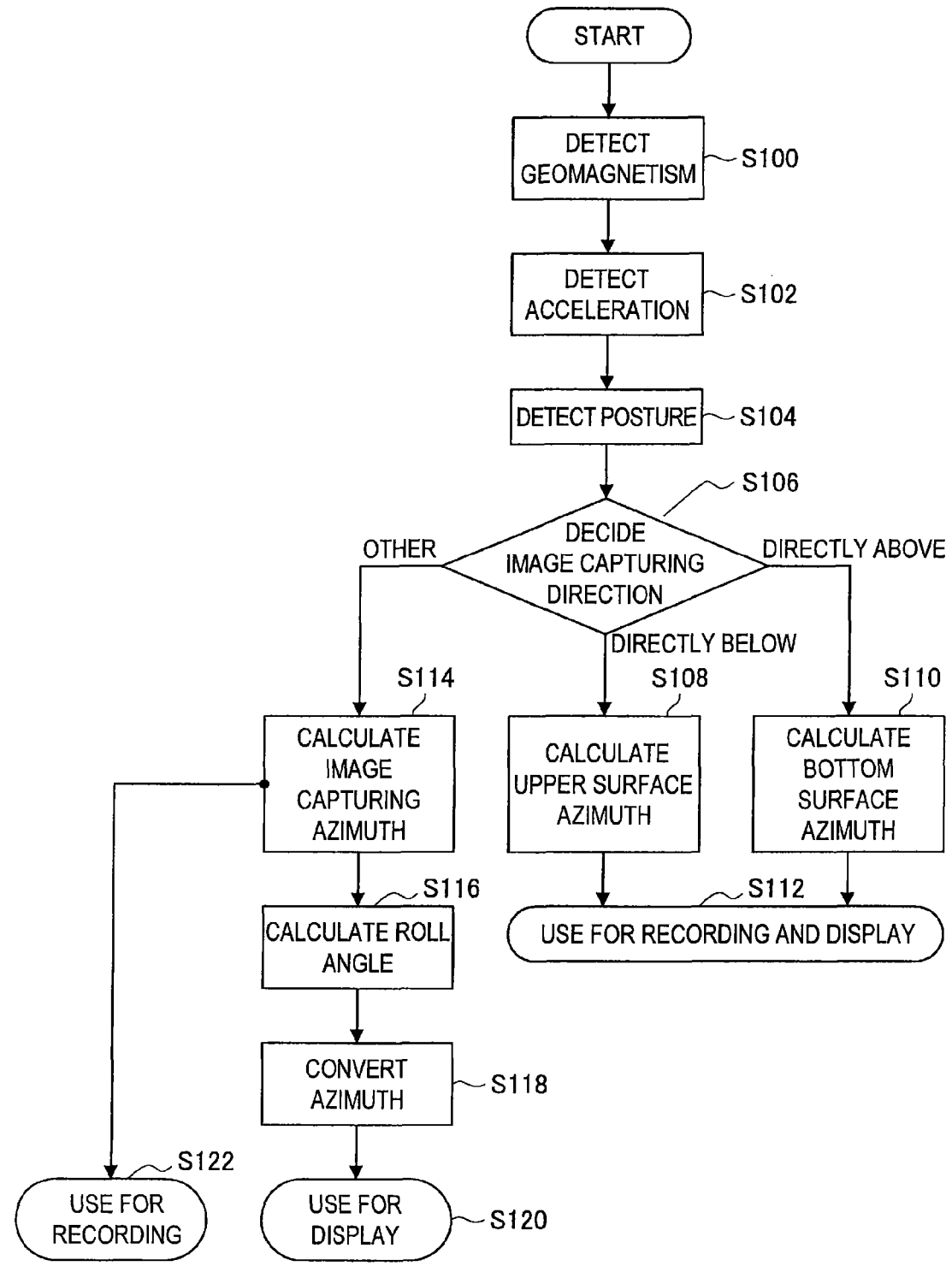

IMAGING DEVICE, AZIMUTH INFORMATION PROCESSING METHOD AND PROGRAM

TECHNICAL FIELD

The present invention relates to an imaging device, an azimuth information processing method and a program.

BACKGROUND ART

In recent years, models of imaging devices such as digital cameras on which electronic compasses are mounted appearing. An electronic compass has a function of electronically calculating an azimuth in which a device directly faces, based on the geomagnetism detected by a geomagnetic sensor. By mounting the electronic compass on a digital camera, it is possible to display a two-dimensional compass image showing an azimuth (that is, an azimuth in an image capturing direction) in which the digital camera faces, and makes a camera user recognize the azimuth.

Meanwhile, azimuth information used in an imaging device such as a digital camera is also used for a purpose of recording an azimuth in the image capturing direction (hereinafter, image capturing azimuth) as additional information of a captured image, in addition to a purpose of displaying the above compass image. For example, a digital camera disclosed in Patent Literature 1 superimposes and displays captured azimuth information obtained by an electronic compass, on a captured image displayed on a display unit, and associates and records the captured azimuth information as additional information of the captured image, with the captured image. Further, the digital camera disclosed in Patent Literature 1 has a mechanism which can rotate an image capturing unit with respect to a main body unit, and correct and record image capturing azimuth information obtained by the electronic compass according to a rotating state of the image capturing unit with respect to the main body unit.

CITATION LIST

Patent Literature

Patent Literature 1: Japanese Patent No. 3781016

SUMMARY OF INVENTION

Technical Problem

Meanwhile, although the digital camera disclosed in Patent Literature 1 corrects the azimuth obtained by the electronic compass according to the rotating state of the image capturing unit with respect to the main body unit, the digital camera does not correct the azimuth (hereinafter, "display azimuth") for displaying an image on the display unit according to a change of a posture of the digital camera (for example, rotation in a roll direction). However, there is the following problem if the display azimuth is not corrected according to the change in the camera posture.

With a general digital camera, a lens is disposed on a back surface of a display surface, and therefore the image capturing direction (that is, an optical axis direction of the lens) and a back surface direction of the display screen (that is, a facing direction of the camera) match. A case will be described where the user holds the digital camera such that the display screen stands vertically (90 degrees) with respect to the ground, and captures an image placing the image capturing direction in the horizontal direction. In this case, the electronic compass of the digital camera calculates the horizontal azimuth of the image capturing direction, and displays the compass image with the horizontal azimuth directed upward, on the display unit.

Even when an image is captured by rotating the digital camera 90 degrees in the roll direction while the user holds the camera vertically maintaining the angle between the ground and the display screen (that is, vertical image capturing is performed), an azimuth in which the user faces (yaw direction) does not change and an image capturing direction is invariable. Consequently, irrespectively of a change in a camera posture (rotation in the roll direction), displaying a compass image such that the compass image showing the image capturing direction is directed toward the ground in a fixed direction at all times is natural for the user's viewpoint.

To display the compass image in this way, it is only necessary to correct the image capturing direction calculated by the electronic compass by a rotation angle in the roll direction and find the display azimuth, and display the compass image showing this display azimuth on the display unit. By this means, even when the camera is rotated in the roll direction, the compass image on the display screen faces in the fixed direction with respect to the ground at all times from the user's viewpoint. Hence, a display mode of the compass image showing the image capturing azimuth becomes natural for the user.

However, the display azimuth corrected as described above is different from an actual image capturing azimuth. Hence, when the display azimuth is recorded as additional information of a captured image, correct image capturing azimuth information cannot be recorded, and the correct image capturing azimuth of the captured image cannot be presented upon playback of the captured image.

As described above, the digital camera with a conventional electronic compass does not correct the display azimuth according to a change in the camera posture (for example, a change from horizontal image capturing to vertical image capturing), and does not separately use the display azimuth and a recording azimuth (correct image capturing azimuth) as additional information of a captured image.

In light of the above problem, it is therefore an object of the present invention to display a compass image in a natural mode when seen from a user's viewpoint even when a posture of an imaging device changes, and record a correct image capturing azimuth.

Solution to Problem

According to an aspect of the present invention in order to achieve the above-mentioned object, there is provided an imaging device including: an image capturing unit which captures an image of a subject and outputs the captured image; an azimuth calculating unit which calculates an azimuth of the image capturing unit in an image capturing direction, based on geomagnetism information detected by a geomagnetic sensor and acceleration information detected by an acceleration sensor; an azimuth converting unit which calculates a rotation angle of the imaging device in a roll direction, based on the acceleration information, and converts the azimuth in the image capturing direction into a display azimuth based on the rotation angle in the roll direction; a display unit which displays a compass image representing the display azimuth and the captured image; and a recording unit which associates azimuth information representing the azimuth in the image capturing direction, with the captured image to record in a recording medium.

Preferably, the azimuth calculating unit calculates a rotation angle of the imaging device in a pitch direction based on the acceleration information, and detects whether or not the image capturing direction is a virtually vertical direction based on the rotation angle in the pitch direction, when the image capturing direction is the virtually vertical direction, the azimuth calculating unit calculates an azimuth in a direction vertical to the image capturing direction instead of the azimuth in the image capturing direction; the display unit displays a compass image representing the azimuth in the direction vertical to the image capturing direction instead of the compass image representing the display azimuth, and the captured image; and the recording unit associates azimuth information representing the azimuth in the direction vertical to the image capturing direction instead of the azimuth information representing the azimuth in the image capturing direction, with the captured image to record in the recording medium.

Preferably, the azimuth calculating unit calculates the rotation angle of the imaging device in the pitch direction based on the acceleration information, and detects whether or not the image capturing direction is a virtually vertically downward direction based on the rotation angle in the pitch direction, when the image capturing direction is the virtually vertically downward direction, the azimuth calculating unit calculates an azimuth of the imaging device in an upper surface direction instead of the azimuth in the image capturing direction; the display unit displays a compass image representing the azimuth in the upper surface direction instead of the compass image representing the display azimuth, and the captured image; and the recording unit associates azimuth information representing the azimuth in the upper surface direction instead of the azimuth information representing the azimuth in the image capturing direction, with the captured image to record in the recording medium.

Preferably, the azimuth calculating unit calculates the rotation angle of the imaging device in the pitch direction based on the acceleration information, and detects whether or not the image capturing direction is a virtually vertically upward direction based on the rotation angle in the pitch direction, when the image capturing direction is the virtually vertically upward direction, the azimuth calculating unit calculates an azimuth of the imaging device in a bottom surface direction instead of the azimuth in the image capturing direction; the display unit displays a compass image representing the azimuth in the bottom surface direction instead of the compass image representing the display azimuth, and the captured image; and the recording unit associates azimuth information representing the azimuth in the bottom surface direction instead of the azimuth information representing the azimuth in the image capturing direction, with the captured image to record in the recording medium.

Preferably, the imaging device further includes a playback unit which plays back the captured image and the azimuth information recorded in the recording medium, and the display unit displays a compass image representing an azimuth of the azimuth information played back by the playback unit, and the captured image played back by the playback unit.

Further, according to another aspect of the present invention in order to achieve the above-mentioned object, there is provided an azimuth information method including the steps of: calculating an azimuth of an image capturing unit in an image capturing direction, based on geomagnetism information detected by a geomagnetic sensor and acceleration information detected by an acceleration sensor, while capturing an image of a subject with the image capturing unit; calculating a rotation angle of the imaging device in a roll direction, based on the acceleration information, and converting the azimuth in the image capturing direction into a display azimuth based on the rotation angle in the roll direction; displaying a compass image representing the display azimuth and the captured image output from the image capturing unit; and associating azimuth information representing the azimuth in the image capturing direction, with the captured image to record in a recording medium.

Further, according to another aspect of the present invention in order to achieve the above-mentioned object, there is provided a program for causing a computer to execute the steps of: calculating an azimuth of an image capturing unit in an image capturing direction, based on geomagnetism information detected by a geomagnetic sensor and acceleration information detected by an acceleration sensor, while capturing an image of a subject with the image capturing unit; calculating a rotation angle of the imaging device in a roll direction, based on the acceleration information, and converting the azimuth in the image capturing direction into a display azimuth based on the rotation angle in the roll direction; displaying a compass image representing the display azimuth and the captured image output from the image capturing unit; and associating azimuth information representing the azimuth in the image capturing direction, with the captured image to record in a recording medium.

According to the above configuration, while an image of a subject is captured by the image capturing unit, an azimuth of the image capturing direction of the image capturing unit is calculated based on geomagnetism information detected by a geomagnetic sensor and acceleration information detected by an acceleration sensor, a rotation angle of the imaging device in the roll direction is calculated based on the acceleration information, the azimuth in the image capturing direction is converted into the display azimuth based on the rotation angle in the roll direction, the compass image representing the display azimuth is displayed together with the captured image output from the image capturing unit and azimuth information representing the azimuth in the image capturing direction is associated with the captured image and recorded in a recording medium. Consequently, while the display azimuth converted from the azimuth in the image capturing direction according to the posture of the imaging device (the rotation angle in the roll direction) is used for the display azimuth on the display unit upon image capturing, the azimuth in the image capturing can be used as an azimuth recorded as additional information of the captured image.

Advantageous Effects of Invention

According to the present invention described above, even when the posture of the imaging device changes, it is possible to display a compass image in a natural mode when seen from a user's viewpoint and record a correct image capturing azimuth.

BRIEF DESCRIPTION OF DRAWINGS

FIG. 17 is a flowchart illustrating an azimuth information processing method of the imaging device according to the second embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
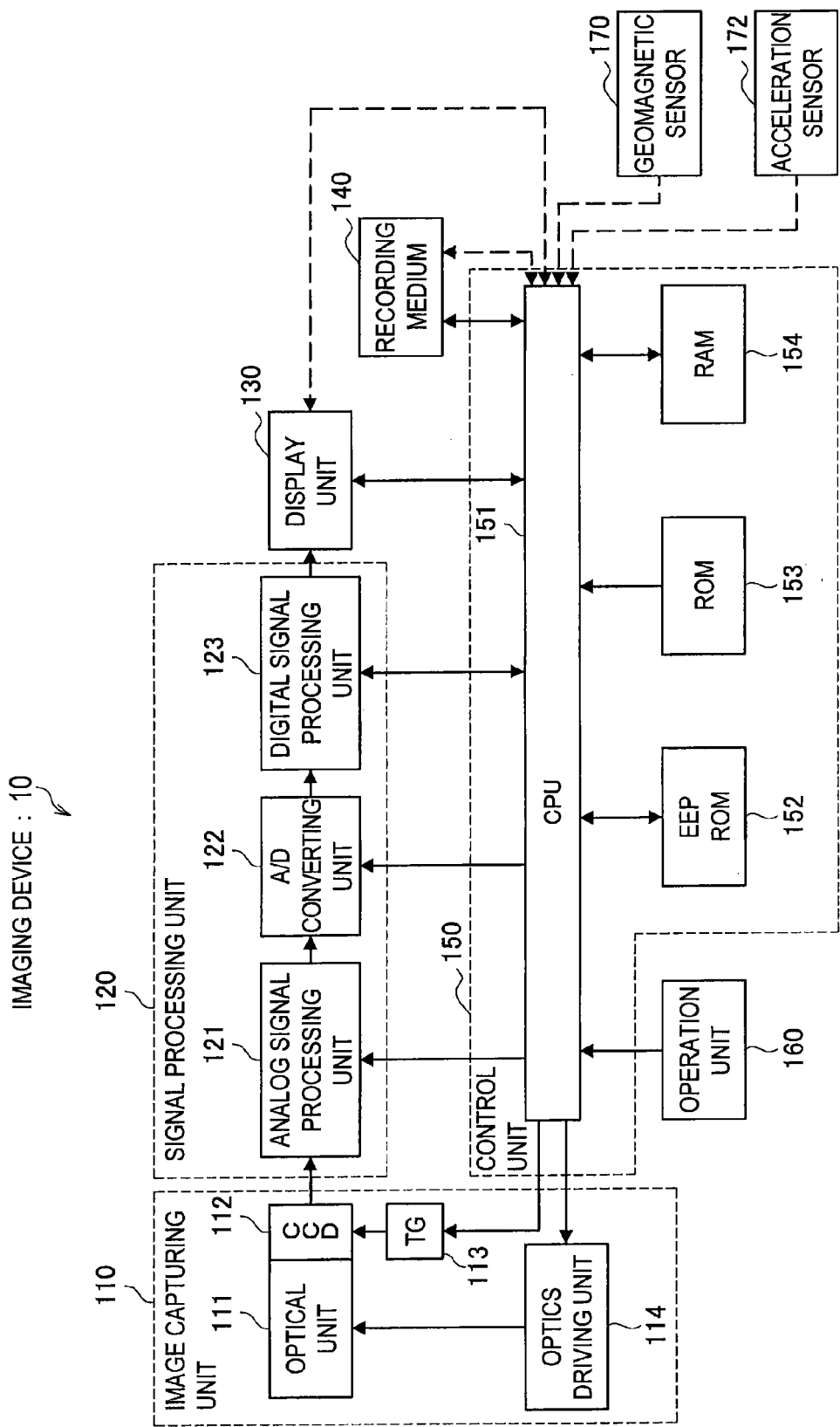
FIG. 1 is a block diagram illustrating a hardware configuration of an imaging device according to a first embodiment of the present invention.

In addition, description will be made in the following order.
1. Hardware Configuration of Imaging Device
2. Functional Configuration of Imaging Device
2.1. Calculation Processing of Image Capturing Azimuth
2.2. Display Processing of Compass Image
2.3. Recording Processing of Image Capturing Azimuth
2.4. Playback Processing of Image Capturing Azimuth
3. Second Embodiment
3.1. Functional Configuration of Imaging Device
3.2. Calculation Processing of Image Capturing Azimuth
3.3. Display Processing of Compass Image
3.4. Azimuth Information Processing Method
4. Conclusion 1. Hardware Configuration of Imaging Device First, a hardware configuration of an imaging device 10 according to a first embodiment of the present invention will be described in detail with reference to FIG. 1. FIG. 1 is a block diagram illustrating the hardware configuration of the imaging device 10 according to the present embodiment. Although the imaging device according to the present invention is embodied by, for example, a digital camera such as the imaging device 10 illustrated in FIG. 1, the imaging device is by no means limited to this example and is applicable to arbitrary electronic devices having an image capturing function.

As illustrated in FIG. 1, the imaging device 10 according to the present embodiment is, for example, a digital camera (for example, a digital still camera or a digital video camera) which can capture still images or shoot a movie. This imaging device 10 captures an image of a subject, and records a captured image (a still image or a movie is fine) obtained by this image capturing, in a recording medium as digital image data.

As illustrated in FIG. 1, the imaging device 10 according to the present embodiment schematically has an image capturing unit 110, a signal processing unit 120, a display unit 130, a recording medium 140, a control unit 150, an operation unit 160, a geomagnetic sensor 170 and an acceleration sensor 172.

The image capturing unit 110 captures an image of a subject, and outputs an analog image signal. The image capturing unit 110 has an image capturing optical unit 111, an image capturing element 112, a timing generator 113 and an optics driving unit 114.

The image capturing optical unit 111 includes various lenses such as a focus lens and a zoom lens, and optics such as an optical filter which removes an unnecessary wavelength and a diaphragm. An optical image (subject image) which is incident from the subject is formed on an exposure side of the image capturing element 112 through each optic in the image capturing optical unit 111. The image capturing element 112 (image sensor) is formed with a solid-state imaging element such as a CCD (Charge Coupled Device) or a CMOS (Complementary Metal Oxide Semiconductor). This image capturing element 112 photoelectrically converts an optical image guided from the image capturing optical unit 111, and outputs an electrical signal (analog image signal) showing a captured image.

The image capturing optical unit 111 is mechanically connected with the optics driving unit 114 for driving the optics of the image capturing optical unit 111. This optics driving unit 114 is, for example, a zoom motor, a focus motor or a diaphragm adjusting mechanism, and moves a zoom lens or a focus lens and adjusts the diaphragm. The optics driving unit 114 drives the optics of the image capturing optical unit 111 according to a command of the control unit 150 which will be described below. Further, the TG (Timing Generator) 113 generates an operation pulse necessary for the image capturing element 112, according to the command of the control unit 150. For example, the TG 113 generates various pulses such as a four-phase pulse for vertical transfer, a feed shift pulse, a two-phase pulse for horizontal transfer and a shutter pulse, and supplies these pulses to the image capturing element 112. When the image capturing element 112 is driven by this TG 113, the image of the subject is captured (electronic shutter function). Further, the TG 113 controls exposure of the captured image by adjusting the shutter speed of the image capturing element 112.

The image signal output from the image capturing element 112 is input to the signal processing unit 120. The signal processing unit 120 executes predetermined signal processing of the image signal output from the image capturing element 112, and outputs the image signal after this signal processing, to the display unit 130 and the control unit 150. The signal processing unit 120 has an analog signal processing unit 121, an analog/digital (A/D) converting unit 122 and a digital signal processing unit 123.

The analog signal processing unit 121 is a so-called analog front end which preprocesses an image signal. The analog signal processing unit 121 performs, for example, CDS (correlated double sampling) processing and gain processing using a programmable gain amplifier (PGA) with respect to the image signal output from the image capturing element 112. The A/D converting unit 122 converts the analog image signal input from the analog signal processing unit 121, into a digital image signal, and outputs the digital image signal to the digital signal processing unit 123. The digital signal processing unit 123 performs digital signal processing such as noise cancellation, white balance adjustment, color correction and edge enhancement and gamma correction of the input digital image signal, and outputs the digital image signal to, for example, the display unit 130 and the control unit 150.

The display unit 130 is formed with a flat display device such as a liquid crystal display (LCD) or an organic EL display. The display unit 130 displays various items of input image data under control of the control unit 150. For example, the display unit 130 displays a captured image (through image) input from the signal processing unit 120 in real time during image capturing. Consequently, the user can operate the imaging device 10 while looking at through images which are captured by the imaging device 10. Further, when the captured image recorded in the recording medium 140 is played back, the display unit 130 displays the playback image. By this means, the user can check content of the captured image recorded in the recording medium 140.

The recording medium 140 stores various items of data such as data of the captured image and meta data of the data. For the recording medium 140, for example, a semiconductor memory such as a memory card, or a disc recording medium such as an optical disc and a hard disc can be used. In addition, the optical disc includes, for example, Blu-ray Disc, a DVD (Digital Versatile Disc) or a CD (Compact Disc). In addition, the recording medium 140 may be built in the imaging device 10 or a removable medium which is detachable from the imaging device 10.

The control unit 150 is formed with, for example, a microcontroller, and controls the entire operation of the imaging device 10. The control unit 150 has, for example, a CPU 151, a EEPROM 152, a ROM (Read Only Memory) 153 and a RAM (Random Access Memory) 154. In addition, EEPROM is abbreviated as "Electrically Erasable Programmable ROM".

The ROM 153 in the control unit 150 stores a program for causing the CPU 151 to execute various control processing. The CPU 151 operates based on the program, and executes computing/control processing required for each control, using the RAM 154. The program can be stored in advance in a storage device (for example, the EEPROM 152 and the ROM 153) built in the imaging device 10. Further, the program may be stored in a removable recording medium such as a disc recording medium or a memory card and provided to the imaging device 10, or may be downloaded to the imaging device 10 through a network such as LAN or Internet.

Hereinafter, a specific control example by the control unit 150 will be described. The control unit 150 controls the TG 113 of the image capturing unit 110 or the optics driving unit 114 to control image capturing processing by the image capturing unit 110. For example, the control unit 150 performs automatic exposure control (AE function) by adjusting the diaphragm of the image capturing optical unit 111, setting the electronic shutter speed of the image capturing element 112, or setting the gain of the AGC of the analog signal processing unit 121. Further, the control unit 150 performs auto focus control (AF function) of automatically adjusting focus of the image capturing optical unit 111 on a specific subject by moving the focus lens of the image capturing optical unit 111 and changing the focus position. Furthermore, the control unit 150 adjusts the angle of view of the captured image by moving the zoom lens of the image capturing optical unit 111 and changing the zoom position. Still further, the control unit 150 records the captured image and various items of data such as meta data in the recording medium 140, and reads and plays back data recorded in the recording medium 140. Moreover, the control unit 150 generates various display images to display on the display unit 130, and controls the display unit 130 to display the display image.

The operation unit 160 and the display unit 130 function as user interfaces. The operation unit 160 is formed with various operation keys such as buttons and a lever or a touch panel, and outputs command information to the control unit 150 according to a user's operation.

The geomagnetic sensor 170 and the acceleration sensor 172 form an electronic sensor (azimuth sensor) for detecting the image capturing azimuth. Meanwhile, the image capturing azimuth is the horizontal azimuth of the image capturing direction for capturing an image of the subject using the imaging device 10. The image capturing azimuth can be represented by an azimuth angle θ (θ=0 degree to 360 degrees) based on, for example, a reference azimuth (for example, north). Further, the image capturing direction is an optical axis direction of the image capturing optical unit 111. With a general digital camera, the image capturing direction is the facing direction of the imaging device 10, and matches with the back surface direction of the display screen of the display unit 130.

The geomagnetic sensor 170 is formed with, for example, a biaxial geomagnetic sensor or a triaxial geomagnetic sensor, and detects the geomagnetism at a location at which the imaging device 10 exists. The biaxial geomagnetic sensor detects the geomagnetism in front and back directions and in left and right directions of the imaging device 10, and the triaxial geomagnetic sensor detects the geomagnetism in front and back directions, in left and right directions and in up and down directions of the imaging device 10. The geomagnetic sensor 170 outputs geomagnetism information representing the detected geomagnetism, to the control unit 150.

The acceleration sensor 172 detects the acceleration which works on the imaging device 10. The acceleration sensor 172 is formed with, for example, a triaxial acceleration sensor which detects the acceleration in the front and back, left and right, and up and down directions of the imaging device 10, and detects the triaxial direction acceleration which works on the imaging device 10. The acceleration sensor 172 outputs acceleration information representing the detected triaxial acceleration, to the control unit 150. The control unit 150 calculates the posture and the image capturing azimuth of the imaging device 10 using a detected value (geomagnetism information) of the geomagnetic sensor 170 and a detected value (acceleration information) of the acceleration sensor 172. This calculating method will be described in detail below.

2. Functional Configuration of Imaging Device

Figure 2:
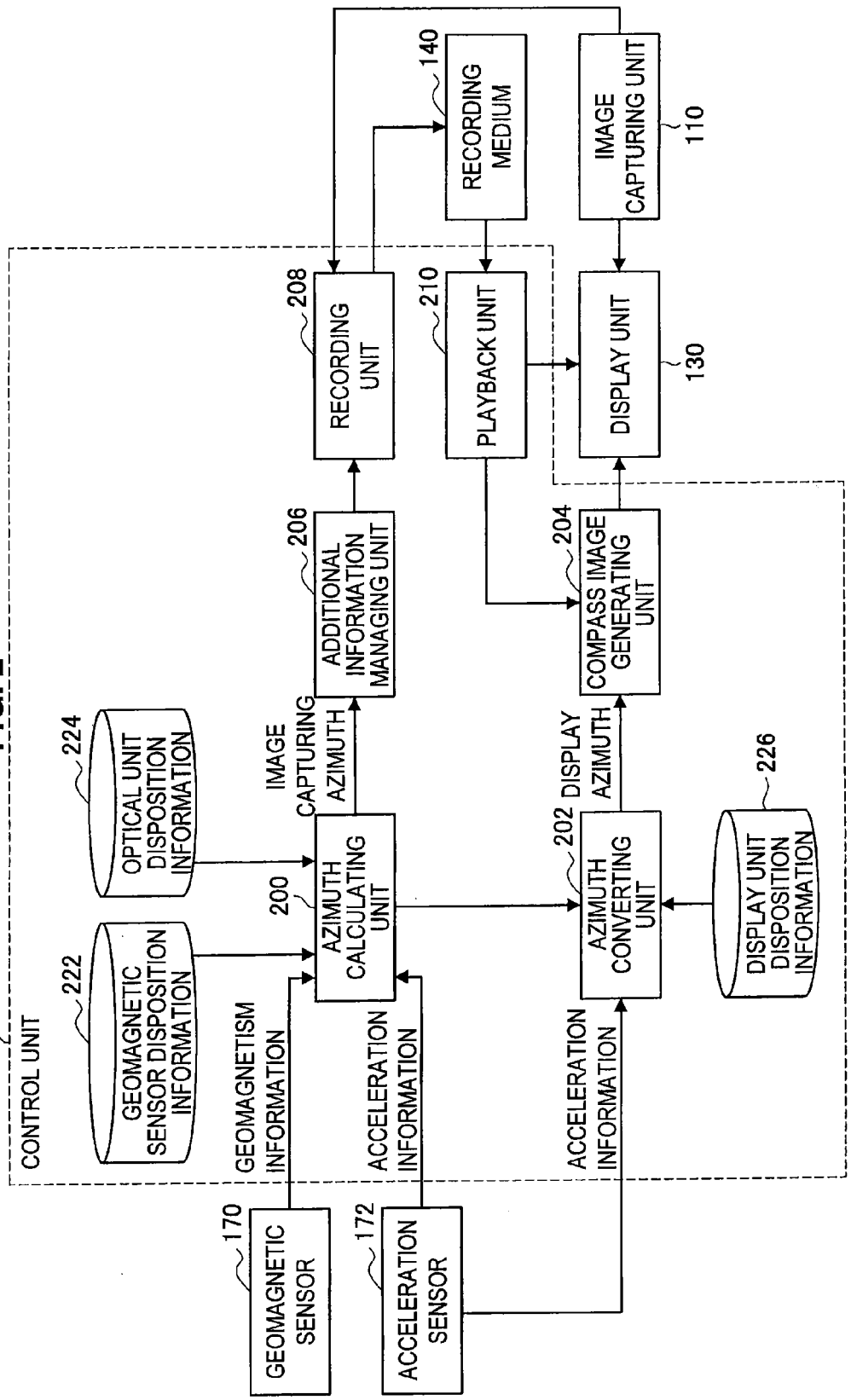
FIG. 2 is a block diagram illustrating a functional configuration of the imaging device according to the first embodiment.

Next, a functional configuration of main units of the imaging device 10 according to the present embodiment and processing of the functional configuration will be described with reference to FIG. 2. FIG. 2 is a block diagram illustrating a functional configuration of the imaging device 10 according to the present embodiment.

As illustrated in FIG. 2, the control unit 150 of the imaging device 10 has an azimuth calculating unit 200, an azimuth converting unit 202, a compass image generating unit 204, an additional information managing unit 206, a recording unit 208 and a playback unit 210. These functional units are realized when the CPU 151 illustrated in FIG. 1 executes the program stored in, for example, the ROM 153, these functional units are by no means limited to this example and may be realized by dedicated hardware.

[2.1. Calculation Processing of Image Capturing Azimuth]

First, processing performed by the azimuth calculating unit 200 to calculate the image capturing azimuth of the imaging device 10 will be described. The azimuth calculating unit 200, and the geomagnetic sensor 170 and the acceleration sensor 172 (azimuth sensor) form the electronic compass which measures the image capturing azimuth. The azimuth calculating unit 200 calculates the image capturing azimuth based on detected values of the geomagnetic sensor 170 and the acceleration sensor 172.

As described above, the geomagnetic sensor 170 detects the geomagnetism at a location at which the imaging device 10 exists, and outputs geomagnetism information as a detected value. Further, the acceleration sensor 172 detects the triaxial direction acceleration which works on the imaging device 10. Using acceleration information detected by this acceleration sensor 172, it is possible to detect the posture (for example, static posture) of the imaging device 10. That is, when the imaging device 10 takes the static posture, the acceleration which works on the imaging device 10 is the gravitational acceleration from Earth. Hence, the posture of the imaging device 10 is detected by calculating the orientation of the gravitation acceleration which works on the imaging device 10 in three-dimensional space, based on triaxial direction acceleration information detected by the acceleration sensor 172. The posture of the imaging device 10 is represented by the inclination of the imaging device 10 with respect to the ground (for example, rotation angles in a roll direction, a pitch direction and a yaw direction).

Figure 3:
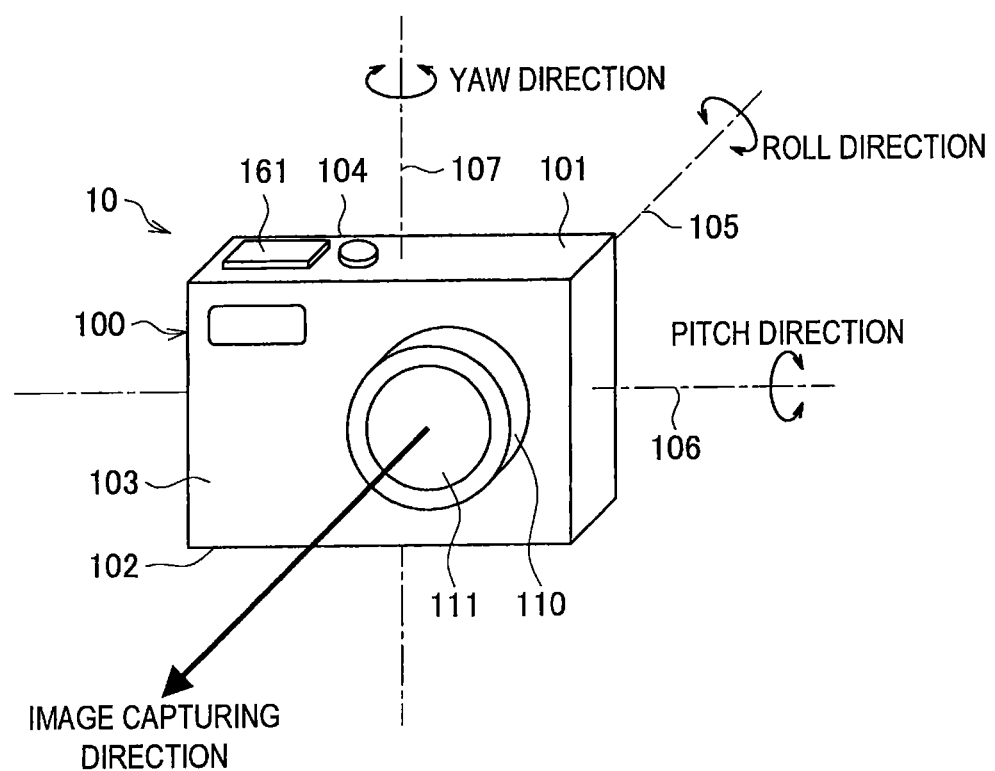
FIG. 3 is a perspective view illustrating an image capturing direction and a posture of the imaging device according to the first embodiment.

Hereinafter, the posture of the imaging device 10 will be described in detail with reference to FIG. 3. FIG. 3 is a perspective view illustrating an image capturing direction and a posture of the imaging device 10 according to the present embodiment.

The imaging device 10 has, for example, a housing 100 of a rectangular shape having an upper surface 101 and a bottom surface 102 which are parallel. The image capturing optical unit 111 of the image capturing unit 110 is provided in a front surface 103 of the housing 100, and the display screen (not illustrated) of the display unit 130 is provided in a back surface 104 of the housing 100. A roll axis 105 is a rotation axis extending in front and back directions of the housing 100, and the imaging device 10 rotates about the roll axis 105 in the roll direction and inclines to the left and right with respect to the ground. Similarly, a pitch axis 106 is a rotation axis extending in the left and right directions of the housing 100, and the imaging device 10 rotates about the pitch axis 106 in the pitch direction and inclines to the back and front with respect to the ground. Further, a yaw axis 107 is a rotation axis extending in the up and down directions of the housing 100, and the imaging device 10 rotates about the yaw axis 107 in the yaw direction and changes the image capturing direction.

As described above, the posture of the imaging device 10 can be represented by rotation angles (roll angle $\alpha$, pitch angle $\beta$ and yaw angle $\gamma$) at which the imaging device 10 rotates in the roll direction, the pitch direction or the yaw direction with respect to the ground. In addition, the roll axis 105 is in the same direction as the image capturing direction of the imaging device 10. Further, when the imaging device 10 rotates in the yaw direction, the horizontal direction in which the imaging device 10 faces also changes, and therefore the image capturing azimuth (the horizontal azimuth in the image capturing direction) also changes.

Further, when the acceleration sensor 172 can learn the rotation angles (an included angle with respect to the ground) of the imaging device 10 in the roll direction, the pitch direction or the yaw direction, it is possible to calculate the geomagnetism in the horizontal direction and finds a correct image capturing azimuth by subtracting the rotation angle from the detected value of geomagnetic sensor 170. In addition, although, even when a monoaxial or biaxial acceleration sensor is used, rotation angles in one or two directions of the imaging device 10 can detected and, consequently, the image capturing azimuth can be calculated, it is possible to more accurately calculate an image capturing azimuth by using a triaxial acceleration sensor.

Back to FIG. 2, description processing performed by the azimuth calculating unit 200 to calculate the image capturing azimuth will continue below. The azimuth calculating unit 200 calculates the posture of the imaging device 10 with respect to the ground, based on acceleration information detected by the acceleration sensor 172. The posture of this imaging device 10 is represented by, for example, rotation angles of the imaging device 10 (roll angle $\alpha$, pitch angle $\beta$ and yaw angle $\gamma$). Further, the azimuth calculating unit 200 calculates the posture of the geomagnetic sensor 170 from the geomagnetic sensor disposition information 222 stored in advance and information of the calculated posture of the imaging device 10. Meanwhile, the geomagnetic sensor disposition information 222 represents a disposed posture of the geomagnetic sensor 170 (the orientation of the geomagnetic sensor 170 with respect to the imaging device 10) disposed in the imaging device 10. The disposed posture of the geomagnetic sensor 170 is known upon manufacturing of the imaging device 10. The azimuth calculating unit 200 finds the posture of the geomagnetic sensor 170 with respect to the ground by adding the posture of the imaging device 10 (roll angle $\alpha$, pitch angle $\beta$ and yaw angle $\gamma$) with respect to the ground, to the disposed posture (default rotation angle) of this geomagnetic sensor 170.

Further, the azimuth calculating unit 200 extracts a geomagnetic horizontal vector from the geomagnetism information measured by the geomagnetic sensor 170 and information of the calculated posture of the geomagnetic sensor 170, and calculates the reference azimuth (for example, the north direction). Furthermore, the azimuth calculating unit 200 calculates a horizontal vector in the optical axis direction (that is, the image capturing direction) of the image capturing optical unit 111 from the optical unit disposition information 224 stored in advance and information of the posture of the imaging device 10 calculated in advance. Meanwhile, the optical unit disposition information 224 represents a disposed posture of the image capturing optical unit 111 (the orientation of the optical axis of the image capturing optical unit 111 with respect to the imaging device 10) disposed in the imaging device 10. This optical unit disposition information 224 is also known upon manufacturing of the imaging device 10. The azimuth calculating unit 200 finds the horizontal azimuth in the image capturing direction (that is, the image capturing azimuth) from the difference between the calculated vector of the reference azimuth and the horizontal vector in the image capturing direction. For example, the azimuth calculating unit 200 finds the azimuth angle $\theta$ ($\theta=0$ degrees to 360 degrees) based on the reference azimuth (for example, north) as the image capturing azimuth.

According to the computing processing by the azimuth calculating unit 200, it is possible to accurately detect the image capturing azimuth. In addition, when the user rotates the imaging device 10 90 degrees in the roll direction to perform vertical image capturing (see FIG. 4 described below), the azimuth calculating unit 200 calculates the horizontal vector in the image capturing direction, so that it is possible to calculate the correct image capturing azimuth.

[2.2. Display Processing of Compass Image]

Next, processing of displaying a compass image representing a display azimuth converted from an image capturing azimuth by the azimuth converting unit 202, the compass image generating unit 204 and the display unit 130 will be described with reference to FIGS. 2 and 3 to 8.

First, the azimuth converting unit 202 illustrated in FIG. 2 converts the image capturing azimuth calculated by the azimuth calculating unit 200 into a display azimuth where necessary. Meanwhile, the display azimuth is an azimuth for displaying information (for example, compass image 302 in FIG. 6) representing the image capturing azimuth on the display unit 130. A compass image 302 displayed on the display unit 130 points the display azimuth in a predetermined reference direction (the direction of the upper surface 101 of the imaging device 10). When the imaging device 10 rotates in the roll direction, the display azimuth differs from an actual image capturing azimuth.

Figure 4:
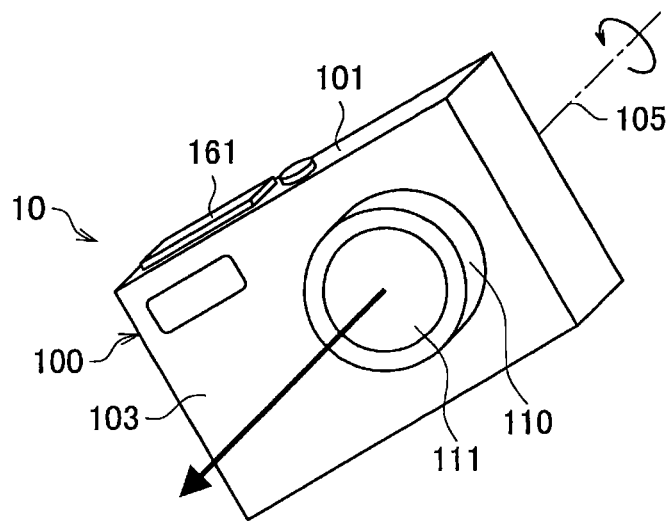
FIG. 4 is a perspective view illustrating the imaging device inclined in a roll direction according to the first embodiment.
Figure 5:
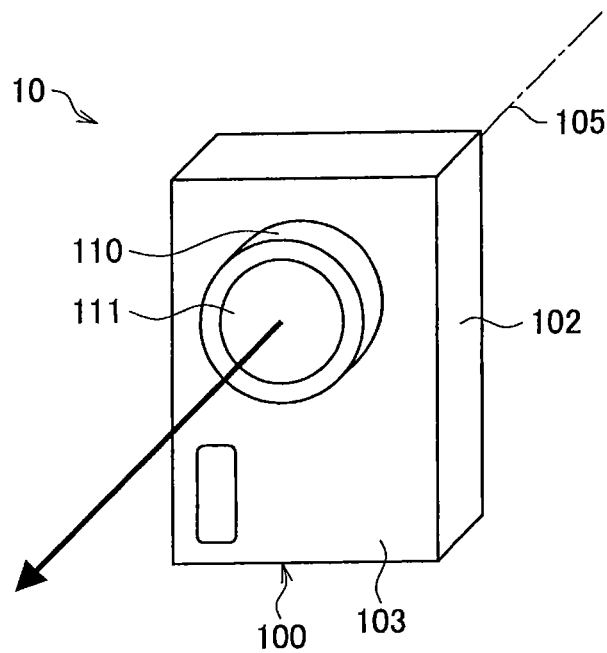
FIG. 5 is a perspective view illustrating the imaging device rotated 90 degrees in the roll direction according to the first embodiment.
Figure 6:
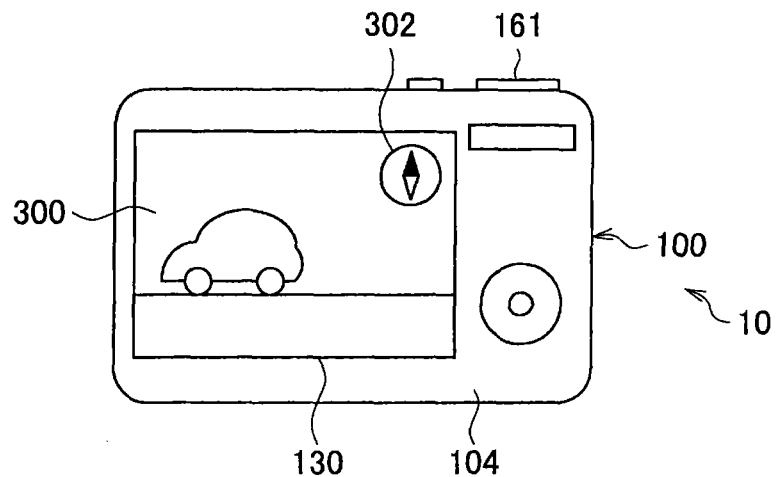
FIG. 6 is a back surface view illustrating a display screen of the imaging device in a state illustrated in FIG. 3.
Figure 7:
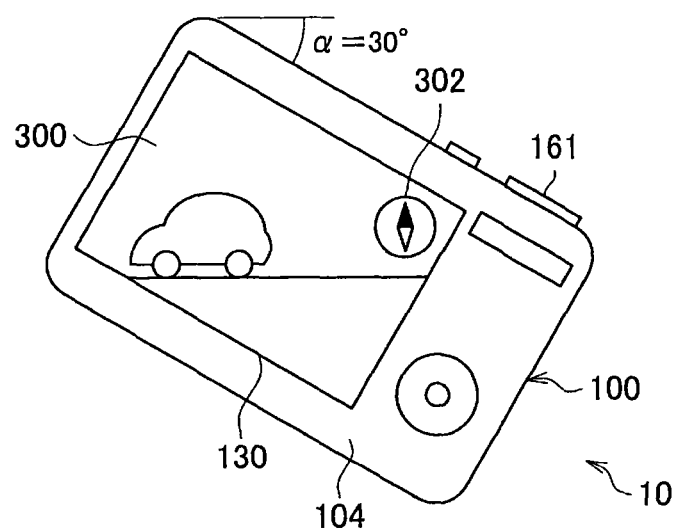
FIG. 7 is a back surface view illustrating a display screen of the imaging device in a state illustrated in FIG. 4.
Figure 8:
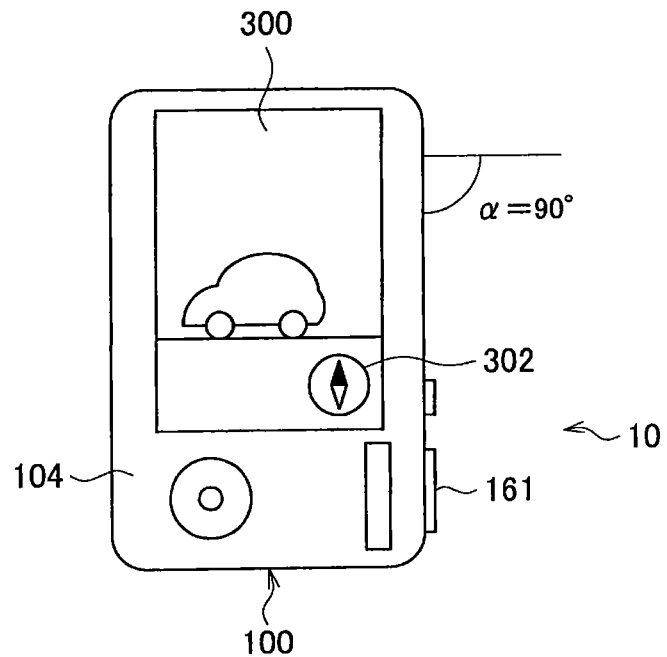
FIG. 8 is a back surface view illustrating a display screen of the imaging device in a state illustrated in FIG. 5.

The necessity of this display azimuth will be described. A case will be described where, in a state where the user facing the north captures an image of a subject (that is, horizontal image capturing) holding the imaging device 10 in the horizontal direction as illustrated in FIG. 3, the user rotates the imaging device 10 in the roll direction about the roll axis 105 as illustrated in FIG. 4 and switches the imaging device 10 in the vertical direction as illustrated in FIG. 5 (roll angle $\alpha$=90 degrees) and captures an image of the same subject (that is, vertical image capturing). In this case, the imaging device 10 does not rotate in the yaw direction and the azimuth (north) in which the user faces does not change, and therefore the image capturing azimuth (north) of the imaging device 10 is also invariable. Hence, as illustrated in FIGS. 6 to 8, the compass image 302 representing the image capturing azimuth is superimposed and displayed on the captured image 300 (through image) displayed on the display unit 130 of the imaging device 10, that the compass image 302 on the display screen is directed in a fixed direction at all times with respect to the ground irrespectively of the change in the posture of the imaging device 10 (rotation in the roll direction) is natural when seen from the user's viewpoint. To display the compass image 302 in this way, the image capturing azimuth (north) calculated by the azimuth calculating unit 200 is corrected by the rotation angle (roll angle $\alpha$=90 degrees) in the roll direction to find the display azimuth (east).

Hence, the azimuth converting unit 202 calculates the rotation angle (roll angle $\alpha$) of the imaging device 10 in the roll direction based on the detected value of the acceleration sensor 172, and corrects the image capturing azimuth calculated by the azimuth converting unit 202 based on the roll angle $\alpha$ to find the display azimuth.

More specifically, the azimuth converting unit 202 first calculates the posture of the imaging device 10 (roll angle $\alpha$, pitch angle $\beta$ and yaw angle $\gamma$) with respect to the ground as described above from the acceleration information detected by the acceleration sensor 172. Next, the azimuth calculating unit 200 calculates the rotation angle (roll angle $\alpha$) of the display unit 130 which rotates in the roll direction following the imaging device 10, from display unit disposition information 226 stored in advance and information of the calculated posture of the imaging device 10. Meanwhile, the display unit disposition information 226 represents a disposed posture (the orientation of the display unit 130 with respect to the imaging device 10) of the display unit 130 disposed in the imaging device 10. The disposed posture of the display unit 130 is known upon manufacturing of the imaging device 10. The azimuth converting unit 202 finds the roll angle $\alpha$ of the display unit 130 by adding the posture of the imaging device 10 (roll angle $\alpha$, pitch angle $\beta$ and yaw angle $\gamma$) with respect to the ground, to the disposed posture of this display unit 130 (default rotation angle).

Further, the azimuth converting unit 202 corrects the image capturing azimuth calculated by the azimuth converting unit 202 by the roll angle $\alpha$ of the display unit 130 to find the display azimuth. When, for example, the image capturing azimuth is represented by the azimuth angle $\theta$ ($\theta$=0 degree to 360 degrees) based on the reference azimuth, the azimuth converting unit 202 subtracts (or adds) the roll angle $\alpha$ of the display unit 130 from the azimuth $\theta$ of the image capturing azimuth and calculates an azimuth angle $\phi$ of the display azimuth ($\phi$=$\theta$±$\alpha$). In addition, when the imaging device 10 does not rotate in the roll direction, $\alpha$=0 degrees holds, and therefore the azimuth angle $\phi$ of the display azimuth becomes equal to the azimuth angle $\theta$ of the image capturing azimuth ($\phi$=$\theta$).

Further, the azimuth converting unit 202 passes information (for example, a value of the azimuth angle $\phi$) representing the display azimuth calculated as described above, to the compass image generating unit 204.

The compass image generating unit 204 generates the compass image 302 to display on the display unit 130, based on information representing the display azimuth calculated by the azimuth converting unit 202. When, for example, the azimuth angle $\phi$ is found based on $\phi$=$\theta$−$\alpha$, the image generating unit 204 generates the compass image 302 in which a needle of a compass points to the reference azimuth (for example, north) toward the display azimuth (azimuth angle $\phi$) Meanwhile, when the azimuth angle $\phi$ is found based on $\phi$=$\theta$+$\alpha$, the compass image generating unit 204 generates the compass image 302 such that the display azimuth (azimuth angle $\phi$) is upward on the display screen. Further, the display unit 130 superimposes and displays the compass image 302 on the captured image 300 input from the image capturing unit 110 based on a command from the control unit 150.

According to the above display processing, as illustrated in FIGS. 6 to 8, the compass image 302 showing the display azimuth (azimuth angle $\phi$) corrected by the azimuth converting unit 202 is displayed on the captured image 300 which is being captured by the image capturing unit 110. Consequently, the user can capture an image while visually checking the image capturing azimuth of the captured image 300. Further, FIGS. 6, 7 and 8 illustrate display states where the roll angles $\alpha$ of the display unit 130 of the imaging device 10 are 0 degree, 30 degrees and 90 degrees. In all cases, the compass image 302 showing the image capturing azimuth is displayed such that the north which is the image capturing azimuth (azimuth angle $\theta$) calculated by the azimuth calculating unit 200 is oriented upward with respect to the ground when seen from the user's viewpoint.

That is, even when the user rotates the imaging device 10 90 degrees in the roll direction as illustrated in FIGS. 3 to 5, although the compass image 302 relatively rotates with respect to the display unit 130 as illustrated in FIGS. 6 to 8, the compass image 302 does not rotate with respect to the ground and the needle of the compass image 302 points to a fixed direction at all times. Thus, the compass image 302 does not rotate following rotation of the display unit 130 in the roll direction, so that, as long as the image capturing azimuth does not change, the azimuth pointed by the compass image 302 on the display screen does not change from the user's viewpoint. Consequently, when the user captures an image of a subject with a fixed azimuth, if the imaging device 10 changes the posture (for example, horizontal image capturing is changed to vertical image capturing), it is possible to display the compass image 302 in a natural display mode when seen from user's viewpoint.

[2.3. Recording Processing of Image Capturing Azimuth]

Next, processing performed by the additional information managing unit 206 and the recording unit 208 to record the calculated image capturing azimuth together with a captured image as additional information will be described referring to FIG. 2 again. In addition, processing performed by the user to press the shutter button 161 of the imaging device 10 (release operation) and record a captured image (photograph) of a still image in the recording medium 140 will be mainly described below.

As illustrated in FIG. 2, a captured image is recorded in the recording medium 140 according to the release operation, and the azimuth calculating unit 200 outputs image capturing azimuth information representing the calculated image capturing azimuth (azimuth angle θ) to the additional information managing unit 206 as described above.

The additional information managing unit 206 has a function of managing additional information (for example, Exif information) of the captured image recorded in the recording medium 140. This additional information generally includes, various pieces of information related to a captured image (for example, an image size, a file format, or a compression coding format), image capturing time and date information and a thumbnail image of a recorded image. The additional information managing unit 206 includes image capturing azimuth information obtained by the azimuth calculating unit 200 and posture information of the imaging device 10 in additional information in addition to these pieces of general information. The latter posture information of the imaging device 10 represents, for example, the posture of the imaging device 10 (for example, horizontal image capturing, clockwise image capturing or counterclockwise image capturing) when recording a captured image. The posture information is calculated from the detected value of the acceleration sensor 172 by the azimuth calculating unit 200. The additional information managing unit 206 outputs additional information of the captured image to the recording unit 208.

The recording unit 208 compresses and encodes additional information of the captured image obtained from the additional information managing unit 206 and the captured image obtained from the image capturing unit 110 according to the release operation, and associates and records the additional information and the captured image in the recording medium 140. By this means, the image capturing azimuth information (for example, azimuth angle θ) and posture information of the imaging device 10 (for example, horizontal image capturing, clockwise image capturing or counterclockwise image capturing) are associated with the captured image as additional image of the captured image and recorded. These pieces of information are useful upon playback and display of the captured image.

As described above, the recording unit 208 records the image capturing azimuth (azimuth angle θ) calculated by the azimuth calculating unit 200 instead of the display azimuth (azimuth angle ϕ) corrected by the azimuth converting unit 202 as additional information of the captured image. By this means, irrespectively of the posture of the imaging device 10 (roll angle α) upon image capturing, it is possible to record the correct image capturing azimuth (azimuth angle θ) obtained when the captured image is captured by the imaging device 10.

In addition, although recording processing of a still image has been described, with movie recording processing, the image capturing azimuth information and posture information only need to be associated with a movie as additional information of the movie and recorded in the recording medium 140 on a regular basis or where necessary during recording of the movie.

[2.4. Playback Processing of Image Capturing Azimuth]

Figure 9:
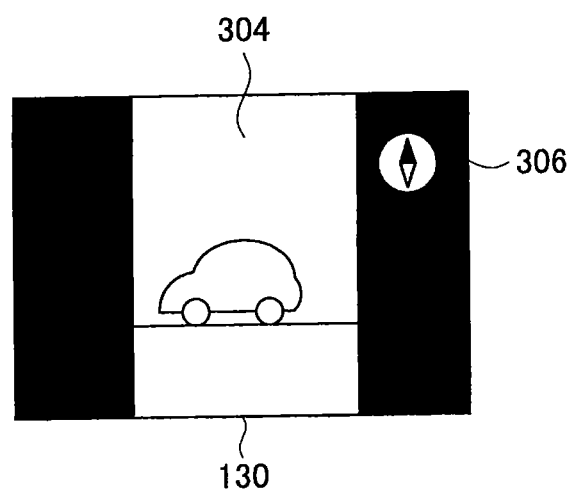
FIG. 9 is a view illustrating a playback screen of the imaging device according to the first embodiment.

Next, processing performed by the display unit 210 illustrated in FIG. 2 and the display unit 130 to playback the captured image and additional information recorded in the recording medium 140 and display the captured image and additional information on the display unit 130 will be described with reference to FIG. 9. FIG. 9 is an explanatory view illustrating a playback image 304 obtained by playing back a captured image 300 (see FIG. 8) upon vertical image capturing according to the present embodiment.

According to a user's playback operation, the playback unit 210 reads and plays back (stretches and decodes) the captured image 300 and additional information of the captured image 300 recorded in the recording medium 140. Further, as illustrated in FIG. 9, the display unit 130 displays the playback image 304 played back by the playback unit 210, and a compass image 306 showing the image capturing azimuth of the playback image 304.

According to this playback and display processing, the playback unit 210 rotates the playback image 304 where necessary based on posture information of the imaging device 10 included in additional information, and displays the playback image 304 on the display unit 130. When, for example, the playback unit 210 plays back the captured image 300 recorded in the recording medium 140, whether or not the captured image 300 is an image captured vertically and a rotation direction upon vertical image capturing are decided based on posture information added to the captured image 300. When the image is vertically captured, the playback unit 210 rotates the playback image 304 90 degrees clockwise or counterclockwise such that the vertical direction is correct, and displays the playback image 304 on the display unit 130.

Further, the playback unit 210 decides the image capturing azimuth when the captured image 300 is captured based on image capturing azimuth information added to the captured image 300, and passes information (for example, azimuth angle θ) representing the image capturing azimuth of the captured image 300, to the compass image generating unit 204. Then, the compass image generating unit 204 generates the compass image 306 to display on the display unit 130 based on information representing the image capturing azimuth, and outputs the compass image 306 to the display unit 130. As a result, as illustrated in FIG. 9, the display unit 130 displays the playback image 304 obtained from the playback unit 210 and the compass image 306 obtained from the compass image generating unit 204. In addition, the playback image 304 in FIG. 9 is an image obtained by playing back the captured image 300 vertically captured in the state illustrated in FIG. 8.

In this case, the compass image 306 displayed together with the playback image 304 shows an actual image capturing azimuth (azimuth angle θ=0 degree) obtained by capturing the captured image 300. This is because, upon recording of the image capturing azimuth information, the image capturing azimuth (azimuth angle θ=0 degree) calculated by the azimuth calculating unit 200 is recorded instead of the display azimuth (azimuth angle ϕ=−90 degrees) corrected by the azimuth converting unit 202. If the display azimuth (azimuth angle φ=−90 degrees) is recorded, the compass image 306 points to the west (corresponding to azimuth angle φ=−90 degrees) on the playback screen in FIG. 9. However, with the present embodiment, the azimuth calculating unit 200 records the calculated image capturing azimuth (azimuth angle θ=0 degree) upon image capturing, so that the compass image 306 displayed together with the playback image 304 can point to the correct image capturing azimuth (azimuth angle θ=0 degree) of the playback image 304.

Further, upon display of the playback image 304, the playback image 304 is automatically rotated and displayed such that the vertical direction of the playback image 304 is up and down directions according to the posture of the imaging device 10 upon image capturing (vertical image capturing or horizontal image capturing). With the example in FIG. 9, the playback image 304 vertically captured is rotated 90 degrees and displayed on a horizontally long display screen of the display unit 130. Consequently, even when, for example, the captured image 300 vertically captured is played back, the playback image 304 representing content of the captured image and the compass image 306 showing the image capturing azimuth can be displayed in an adequate direction without rotating the display unit 130 (see FIG. 9).

As described above, the imaging device 10 according to the present embodiment adequately uses separately the image capturing azimuth (azimuth angle θ) calculated by the azimuth calculating unit 200 and the display azimuth (azimuth angle φ) corrected by the azimuth calculating unit 202. Even when, for example, the posture of the imaging device 10 changes in the roll direction by converting the image capturing azimuth (azimuth angle θ) in the display azimuth (azimuth angle φ) upon image capturing, it is possible to display the compass image 302 showing the image capturing azimuth of the captured image 300 in a natural mode when seen from the user's viewpoint. Meanwhile, upon recording of the captured image 300, the correct image capturing azimuth (azimuth angle θ) before correction is recorded as additional information of the captured image 300. Consequently, upon playback of the captured image 300, it is possible to display the compass image 306 showing the image capturing azimuth (azimuth angle θ) of the captured image 300 together with the playback image 304 in a correction direction. Further, when the captured image 300 is copied to a personal computer (PC) and the azimuth is checked using an application on the PC, the image capturing azimuth (azimuth angle θ) is recorded as the additional information, so that the application can recognize the image capturing azimuth of the captured image 300.

3. Second Embodiment

Next, the imaging device 10 and the azimuth information processing method of the imaging device 10 according to the second embodiment will be described. The second embodiment differs from the first embodiment in processing when the image capturing direction is a vertical direction, and the other functional configurations are substantially the same as the first embodiment and will not be described in details.

When the camera user captures an image of a subject directly above the user or captures an image of a subject directly below the user, the imaging device 10 is directed directly above or directly below and, consequently, the image capturing direction (an optical axis direction of the image capturing optical unit 111) is a virtually vertical direction (a virtually vertically upward direction or a virtually vertically downward direction). In this case, when the azimuth of the image capturing direction is calculated as the image capturing azimuth as in the first embodiment, even if the image capturing direction slightly changes, there is a problem that the image capturing azimuth overreacts and significantly swings. Although, when, for example, an image is captured by directing the imaging device 10 directly below, the image capturing direction is a vertically downward direction, if the imaging device 10 is slightly inclined in a pitch direction or a yaw direction in this state, the image capturing azimuth swings to the east, the west, the south and the north and the compass image 302 remarkably swings and changes on a display screen.

Hence, with the second embodiment, when the image capturing direction is a virtually vertical direction, the azimuth in a direction vertical to the image capturing direction (for example, the direction of the upper surface 101 or the direction of the bottom surface 102 of the imaging device 10) to display and record the azimuth in the vertical direction. By this means, even when the image capturing direction changes in the vicinity of the vertical direction, the azimuth to be displayed and recorded does not significantly swing and stabilizes, so that it is possible to adequately present the image capturing azimuth to the camera user.

In addition, the "virtually vertical direction" in this specification is a substantially vertical direction, and includes not only a strictly vertical direction (a direction vertical to a horizontal plane) but also a direction including a predetermined angle δ (for example, 0<δ≤10 degrees) with respect to the vertical direction. When the camera user recognizes that the image capturing direction is directly above or directly below, the image capturing direction is a "virtually vertical direction" if not a strictly vertical direction. Similarly, the "virtually vertically downward direction" includes only a strictly vertically downward direction but also a direction including the predetermined angle δ with respect to the vertically downward direction, and the "virtually vertically upward direction" includes not only a strictly vertically upward direction but also a direction including a predetermined angle δ with respect to a vertically upward direction.

[3.1. Functional Configuration of Imaging Device]

Figure 10:
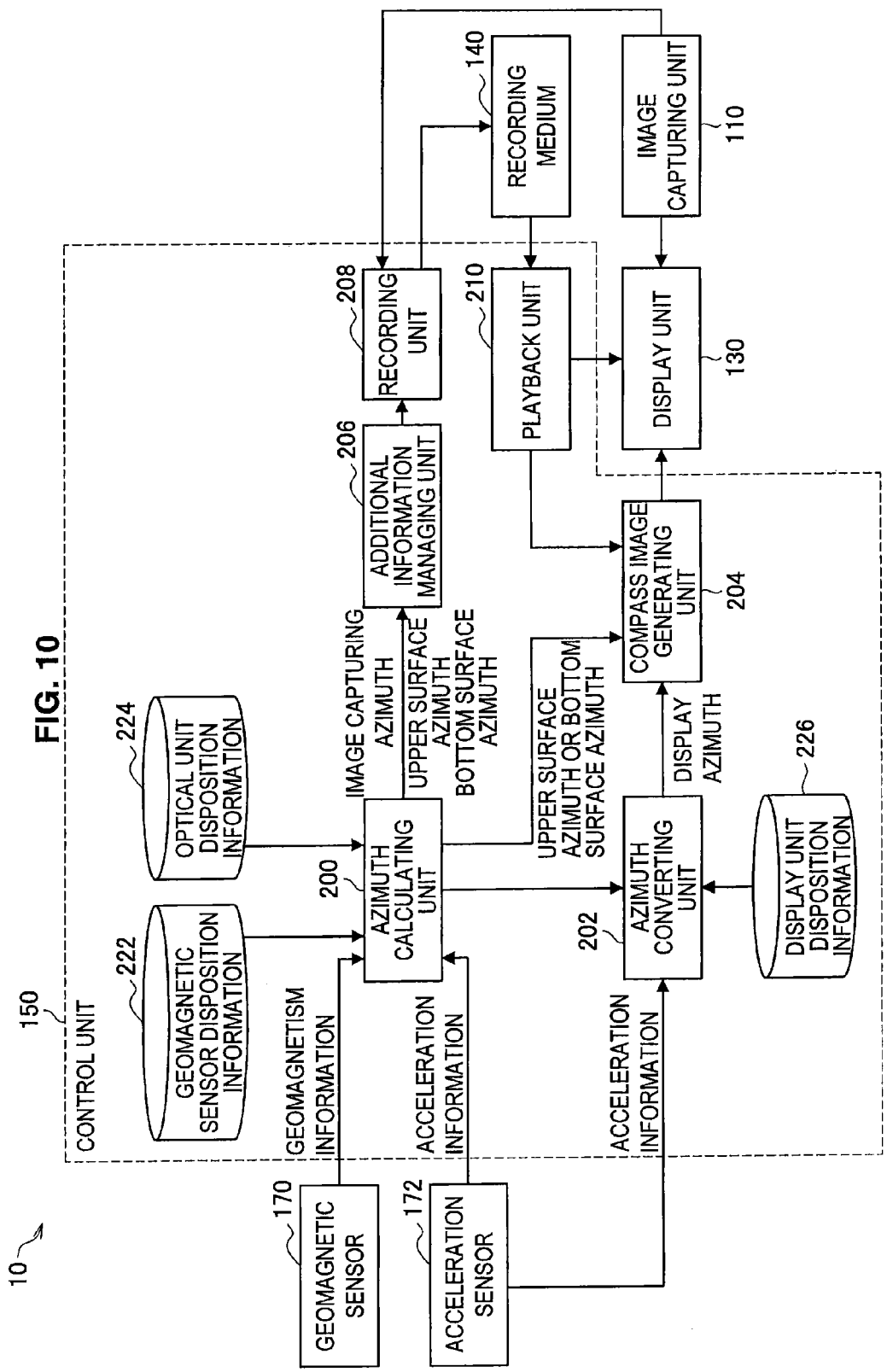
FIG. 10 is a block diagram illustrating a functional configuration of the imaging device according to a second embodiment of the present invention.

Next, a functional configuration of main units of the imaging device 10 and processing of the functional configuration of the imaging device 10 according to the second embodiment will be described with reference to FIG. 10. FIG. 10 is a block diagram illustrating a functional configuration of the imaging device 10 according to the second embodiment.

As illustrated in FIG. 10, the imaging device 10 according to the second embodiment has the following function in addition the function according to the first embodiment. The azimuth calculating unit 200 calculates a rotation angle (pitch angle β) of the imaging device 10 in the pitch direction based on acceleration information obtained from the acceleration sensor 172, and detects whether or not the image capturing direction is the virtually vertical direction (virtually vertically upward direction or virtually vertically downward direction) based on the pitch angle β.

When, for example, the calculated pitch angle β is a pitch angle (90 degrees) representing the vertically upward direction or an angle in the vicinity of the pitch angle [(90 degrees−δ)<β<(90 degrees+δ)], the azimuth calculating unit 200 decides that the image capturing direction is the virtually vertically upward direction. Further, the calculated pitch angle β is a pitch angle (−90 degrees) representing a vertically downward direction or an angle in the vicinity of the pitch angle [(−90 degrees −δ)<β<(−90 degrees+δ)], the azimuth calculating unit 200 decides that the image capturing direction is the virtually vertically downward direction. Thus, it is possible to decide whether the image capturing direction is a virtually vertically upward direction or a virtually vertically downward direction by finding the pitch angle β of the imaging device 10 from a detected value of the acceleration sensor 172 and using the pitch angle β.

As a result of such decision, when the image capturing direction is not a virtually vertical direction, similar to the above-described first embodiment, the azimuth calculating unit 200 calculates the azimuth (image capturing azimuth) in the image capturing direction, and the azimuth converting unit 202 converts the image capturing azimuth into a display azimuth. Subsequent display processing of the compass image 302, and recording and playback processing of image capturing azimuth information are also the same as in the first embodiment.

Figure 11:
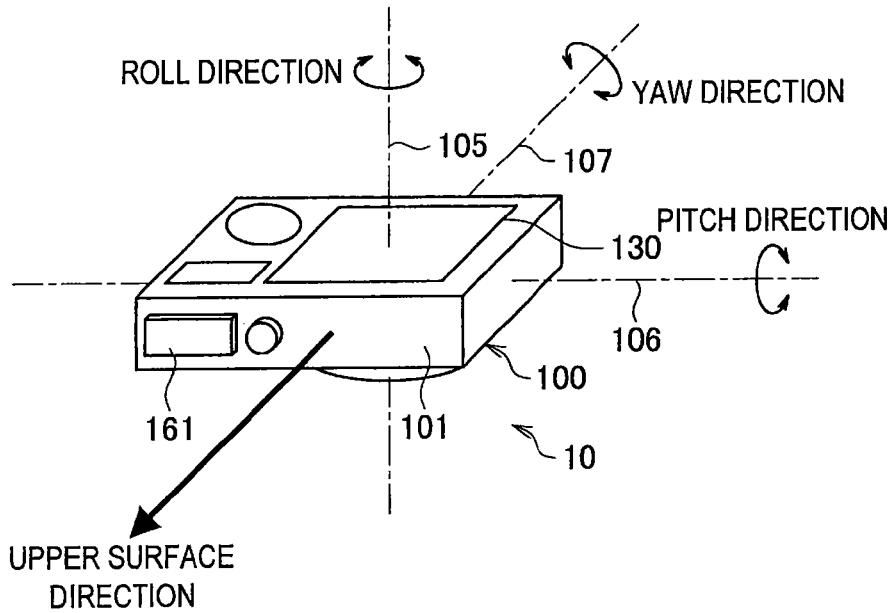
FIG. 11 is a perspective view illustrating an upper surface direction and a posture of the imaging device according to the second embodiment.
Figure 12:
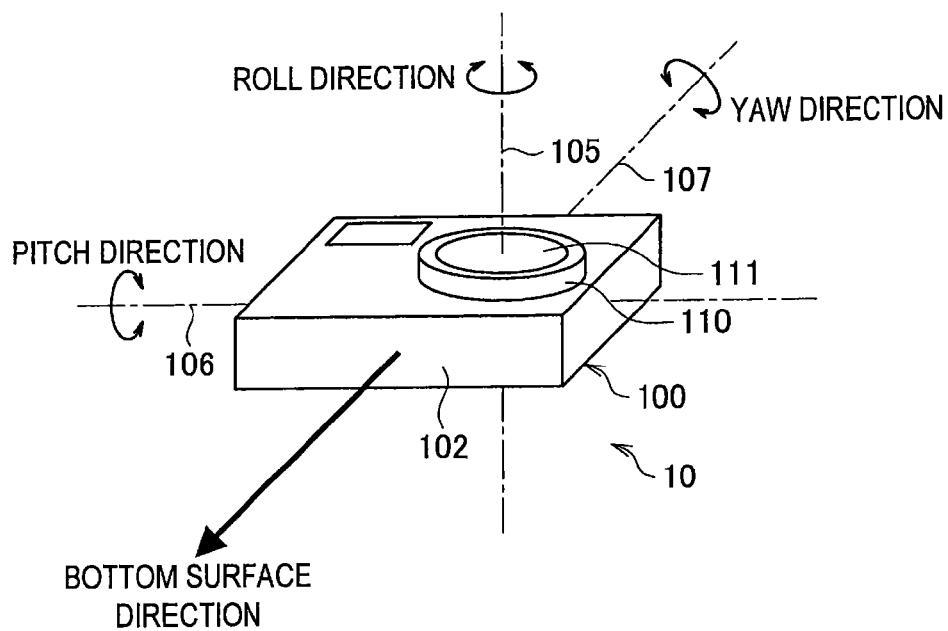
FIG. 12 is a perspective view illustrating a bottom surface direction and a posture of the imaging device according to the second embodiment.

Meanwhile, when the image capturing direction is a virtually vertical direction, the azimuth calculating unit 200 calculates the azimuth in a direction vertical to the image capturing direction instead of the image capturing azimuth. The direction vertical to the image capturing direction is, for example, the upper surface direction of the imaging device 10 or the bottom surface direction of the imaging device 10. Meanwhile, the upper surface direction of the imaging device 10 is a direction in which the upper surface 101 of the imaging device 10 faces as illustrated in FIG. 11, the bottom surface direction of the imaging device 10 is a direction in which the bottom surface 102 of the imaging device 10 faces as illustrated in FIG. 12. The azimuth calculating unit 200 calculates the azimuth of the imaging device 10 in the upper surface direction (hereinafter, upper surface azimuth) when the image capturing direction is a virtually vertically downward direction, and calculates the azimuth in the bottom surface direction (hereinafter, the bottom surface azimuth) when the image capturing direction is a virtually vertically upward direction. In addition, a direction in which a left or right lateral surface of the imaging device 10 faces may be used for a direction vertical to the image capturing direction in addition to the upper surface direction and the bottom surface direction.

Thus, when the image capturing direction is a virtually vertical direction, the azimuth calculating unit 200 calculates the upper surface azimuth or the bottom surface azimuth (azimuth angle ψ) instead of the image capturing azimuth (azimuth angle θ) according to the first embodiment. This upper surface azimuth or the bottom surface azimuth is the azimuth in the direction vertical to the image capturing direction. Consequently, although, when the imaging device 10 directed directly above or directly below rotates slightly in the roll direction or the yaw direction and the image capturing direction changes more or less, the image capturing azimuth (azimuth angle θ) significantly swings, the upper surface or the bottom surface azimuth (azimuth angle ψ) does not significantly swing. Consequently, when an image of a subject in the virtually vertical upward direction or the virtually vertically downward direction of the imaging device 10, it is possible to stably obtain the azimuth by calculating the upper azimuth or the bottom surface azimuth (azimuth angle ψ).

Figure 13:
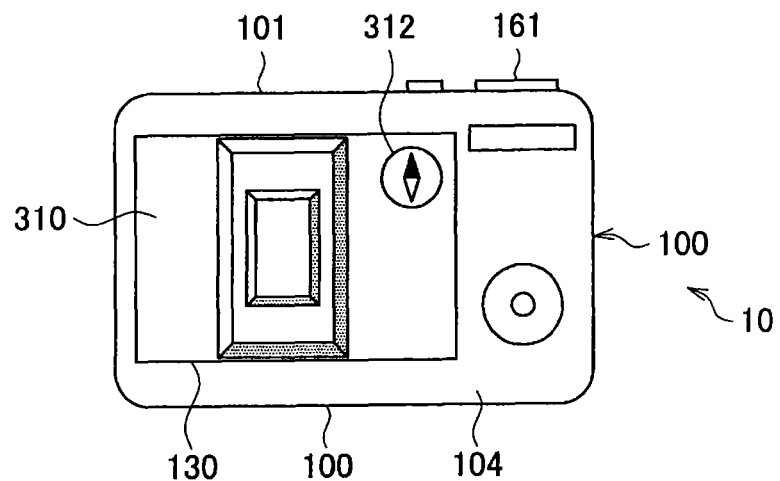
FIG. 13 is a perspective view illustrating a display screen of the imaging device according to the second embodiment.

Next, the azimuth calculating unit 200 directly outputs information representing the calculated upper surface azimuth or bottom surface azimuth to the compass image generating unit 204 without the azimuth converting unit 202. Then, as illustrated in FIG. 13, the compass image generating unit 204 generates a compass image 312 representing the upper surface azimuth or the bottom surface azimuth (azimuth ψ) calculated by the azimuth calculating unit 200, and the display unit 130 superimposes and displays the compass image 312 on the captured image 310. Thus, the display unit 130 according to the second embodiment displays the compass image 312 representing the upper surface azimuth or the bottom surface azimuth (azimuth angle ψ) together with the captured image 310 which is being captured instead of the compass image 302 representing the display azimuth (azimuth angle ϕ) as in the first embodiment.

Figure 14:
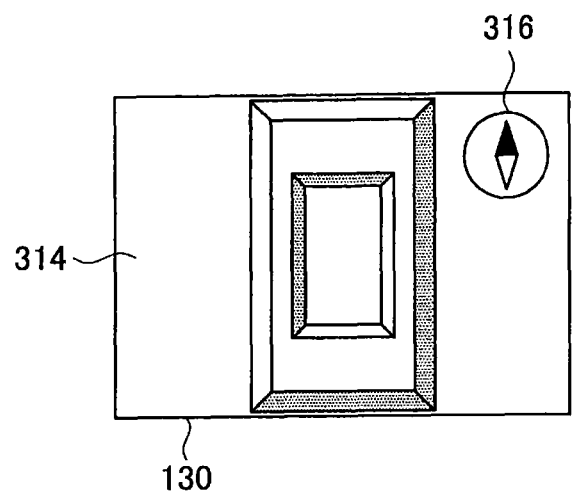
FIG. 14 is a view illustrating a playback screen of an image captured in a state of FIG. 13.

Further, also when the captured image 310 is recorded, the recording unit 208 associates and records azimuth information representing the upper surface azimuth or the bottom surface azimuth (azimuth angle ψ) and the captured image 310 as additional information of the captured image 310 in the recording medium 140 instead of information representing the image capturing azimuth (azimuth angle θ) according to the first embodiment. Further, when the captured image 310 recorded in the recording medium 140 is played and displayed, the playback unit 210 first plays back the captured image 310 recorded in the recording medium 140, and the compass image generating unit 204 generates a compass image 316 representing the upper surface azimuth or the bottom surface azimuth (azimuth angle ψ) based on azimuth information recorded in the recording medium 140. As a result, as illustrated in FIG. 14, the display unit 130 displays the compass image 316 representing the upper surface azimuth or the bottom surface azimuth (azimuth angle ψ) together with the playback image 314.

In addition, the imaging device 10 according to the first embodiment decides the posture of the imaging device 10 in the roll direction upon image capturing (for example, horizontal image capturing, clockwise image capturing or counterclockwise image capturing) based on posture information recorded as additional information of the captured image 300 upon playback, and automatically rotates the playback image 304 90 degrees according to the posture in the roll direction and displays the playback image 304 (see FIG. 9). The captured image 300 captured by directing the imaging device 10 in a virtually horizontal direction has the orientation which serves as a display reference (for example, the captured image 300 is displayed such that the upper surface direction is upside down), so that user's convenience is improved by rotation display processing as in FIG. 9.

By contrast with this, when azimuth information of the image capturing direction is recorded as azimuth information upon image capturing, the imaging device 10 according to the second embodiment performs posture decision and rotation display processing upon playback similar to the first embodiment. However, the image capturing direction is directly below (or directly above), and, when information representing the upper surface azimuth (or bottom surface azimuth) is recorded as azimuth information upon image capturing, the imaging device 10 does not perform posture decision and rotation display processing as in the first embodiment. The captured image 310 captured by directing the imaging device 10 in the virtually vertical direction does not include the orientation which serves as the display reference. Hence, the rotation display processing is not unnecessary for the user, and is preferably omitted.

[3.2. Calculation Processing of Image Capturing Azimuth]

Next, processing of calculating the upper surface azimuth when an image captured by directing the imaging device 10 directly below will be described with reference to FIG. 11.

As illustrated in FIG. 11, when the user directs the imaging device 10 directly below to capture an image of a subject at the foot, the image capturing direction (optical axis direction of the image capturing optical unit 111) is a virtually vertically downward direction. The azimuth calculating unit 200 can detect that the image capturing direction (the optical axis direction of the image capturing optical unit 111) is a virtually vertically downward direction.

More specifically, the azimuth calculating unit 200 first calculates the posture of the imaging device 10 with respect to the ground (roll angle α, pitch angle β and yaw angle γ) based on acceleration information detected by the acceleration sensor 172. Next, the azimuth calculating unit 200 decides that the image capturing direction is a virtually vertically downward direction when the calculated pitch angle β is greater than an upper limit value (−90 degrees−δ) and is less than a lower limit value (−90 degrees+δ).

When detecting the image capturing direction is a virtually vertically downward direction, the azimuth calculating unit 200 calculates the upper surface azimuth of the imaging device 10 based on geomagnetism information of the geomagnetic sensor 170 and acceleration information of the acceleration sensor 172.

More specifically, the azimuth calculating unit 200 calculates the posture of the geomagnetic sensor 170 from the geomagnetic sensor disposition information 222 and information of the calculated posture of the imaging device 10. Further, the azimuth calculating unit 200 extracts a geomagnetic horizontal vector from the geomagnetism information measured by the geomagnetic sensor 170 and information of the calculated posture of the geomagnetic sensor 170, and calculates the reference azimuth (for example, the north direction). Next, the azimuth calculating unit 200 calculates a vector in the image capturing direction from the optical unit disposition information 224 and information of the calculated posture of the imaging device 10. Further, the azimuth calculating unit 200 finds an upward 90 degree vector (that is, the vector in the upper surface direction) in the pitch direction with respect to the vector in the image capturing direction. Then, the azimuth calculating unit 200 finds the horizontal azimuth (that is, upper surface azimuth) in the upper surface direction from the difference between the calculated vector of the reference azimuth and the vector in the upper surface direction. For example, the azimuth calculating unit 200 finds the azimuth angle ψ(ψ=0 degree to 360 degrees) using this upper surface azimuth as the reference azimuth (for example, north).

[3.3. Display Processing of Compass Image]

Next, processing of displaying the compass images 312 and 316 representing the upper surface azimuth when an image is captured directing the imaging device 10 directly below will be described in detail with reference to FIGS. 13 to 16.

As described above, the azimuth calculating unit 200 calculates the upper surface azimuth (azimuth angle ψ), and outputs information representing the upper surface azimuth, to the compass image generating unit 204 without the azimuth converting unit 202. Then, the compass image generating unit 204 generates the compass image 312 representing the upper surface azimuth (azimuth angle ψ), and the display unit 130 superimposes and displays the compass image 312 on the captured image 310.

Hereinafter, a display mode of the compass image 312 upon image capturing will be described with reference to FIGS. 13 and 15. With the example in FIG. 13, the upper surface 101 of the imaging device 10 directed directly below faces the north, so that the upper surface direction is the north (ψ=0 degree) and the compass image 312 points to the north. Further, with the example in FIG. 15, the upper surface 101 of the imaging device 10 directed directly below points to north east, so that the upper surface azimuth is the east (ψ=90 degrees) and the compass image 312 points to the east.

Figure 15:
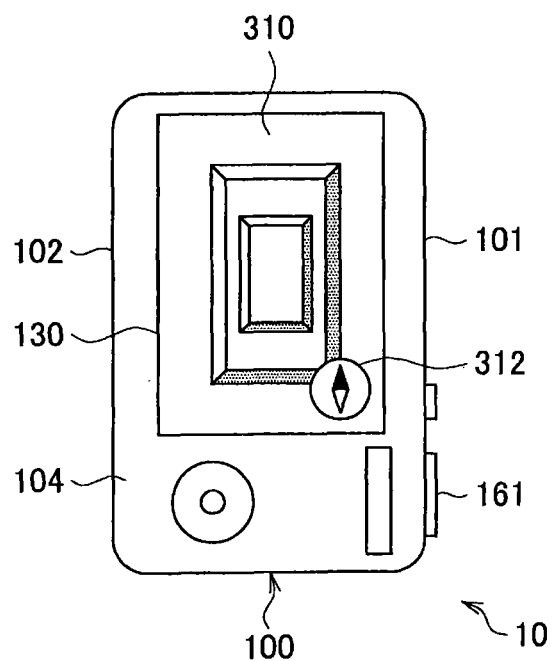
FIG. 15 is a perspective view illustrating a display screen of the imaging device rotated 90 degrees in the roll direction according to the second embodiment.

As is clear from the relationship between these FIGS. 13 and 15, as the azimuth indicated by the compass image 312 on the display screen changes (north→east) when the imaging device 10 (see FIG. 11) directed directly below is horizontally rotated with respect to the ground (rotated about the roll axis 105), as illustrated in FIGS. 13 and 15, when the user faces to the right holding the imaging device 10 directed directly below, it is possible to display the compass image 312 such that the direction of the needle of the compass does not change similar to a case where the compass is put on the ground and rotated to the right. Generally, when the user holds the imaging device 10 horizontally and directs the imaging device 10 directly below, the direction in which the user faces and the upper surface direction of the imaging device 10 match. Consequently, by displaying the compass image 312 as in FIGS. 13 and 15, it is possible to display the azimuth in a natural display mode when seen from a user's viewpoint.

Figure 16:
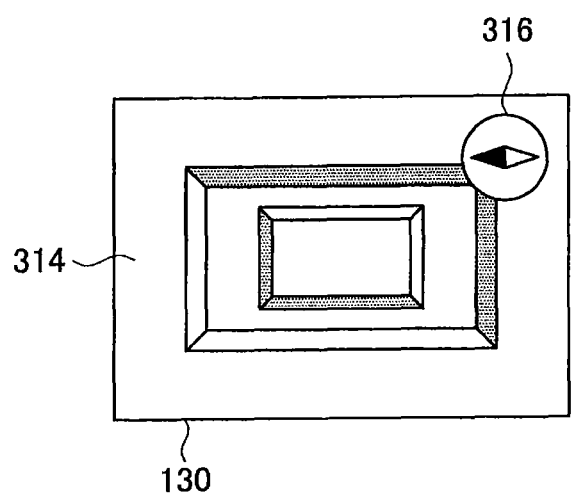
FIG. 16 is a view illustrating a playback screen of an image captured in a state of FIG. 15.

Next, a display mode of the compass image 316 upon image playback will be described with reference to FIGS. 14 and 16. FIG. 14 illustrates a display screen when the captured image 310 recorded in the state in FIG. 13 is played back, and FIG. 16 illustrates a display screen when the captured image 310 recorded in the state in FIG. 15 is played back.

The second embodiment differs from the first embodiment in using the same azimuth (upper surface azimuth) for a display azimuth and a recording azimuth and recording information of the upper surface azimuth as additional information of the captured image 310. Consequently, upon playback and image capturing, it is possible to display the same captured image and compass image.

For example, the playback image 314 and the compass image 316 illustrated in FIG. 14 are displayed on the display unit 130 similar to the captured image 310 and the compass image 312 upon image capturing illustrated in FIG. 13, and the compass image 316 upon playback points to the north. Further, the playback image 314 and the compass image 316 illustrated in FIG. 16 are also displayed on the display unit 130 similar to the captured image 310 and the compass image 312 upon image capturing illustrated in FIG. 15, and the compass image 316 upon playback points to the east. Meanwhile, as is clear from the relationship between FIGS. 15 and 16, when the captured image 310 captured by directing the imaging device 10 in a virtually vertical direction is played back, the playback image 304 illustrated in FIG. 9 is not rotated.

In addition, when an image is captured by directing the imaging device 10 directly above, the azimuth calculating unit 200 calculates the bottom surface azimuth of the imaging device 10, and the display unit 130 displays a compass image representing the bottom surface azimuth upon image capturing and playback. This calculation and display processing is the same as in a case where an image is captured by directing the imaging device 10 directly above, and therefore will not be described in detail.

[3.4. Azimuth Information Processing Method]

Next, the azimuth information processing method of the imaging device 10 according to the second embodiment will be described with reference to FIG. 17. FIG. 17 is a flowchart illustrating the azimuth information processing method of the imaging device 10 according to the second embodiment.

As illustrated in FIG. 17, using the geomagnetic sensor 170, the imaging device 10 first detects, for example, the triaxial direction geomagnetism at a location at which the imaging device 10 exists (S100). Further, the imaging device 10 detects, for example, the triaxial direction gravitational acceleration which works on the imaging device 10, using the acceleration sensor 172 (S102). Next, the imaging device 10 detects the posture of the imaging device 10 (roll angle α, pitch angle β and yaw angle γ) based on acceleration information detected by the acceleration sensor 172 (S104).

Next, the imaging device 10 detects the image capturing direction of the imaging unit 110 based on posture information of the imaging device 10 found in S104, and decides whether or not the image capturing direction is one of the virtually vertically downward direction, the virtually vertically upward direction, and a direction other than the virtually vertically downward direction and the virtually vertically upward direction (S106). More specifically, the imaging device 10 calculates the optical axis direction of the image capturing optical unit 111 (that is, image capturing direction) from posture information of the imaging device 10 and the optical unit disposition information 224. Next, the imaging device 10 decides whether or not the image capturing direction is the virtually vertical direction, based on the pitch angle β of the posture information. Further, when the image capturing direction is the virtually vertical direction, the imaging device 10 decides whether the image capturing direction is the virtually vertically downward direction or the virtually vertically upward direction based on the pitch angle β. When the pitch angle β in a first angle range set in advance (for example, 90 degrees−δ<β<90 degrees+δ), it is decided that the image capturing direction is the virtually vertically upward direction. Further, when the pitch angle β is in a second angle range set in advance (for example, −90 degrees−δ<β<−90 degrees+δ), it is decided that the image capturing direction is the virtually vertically downward direction. Furthermore, when the pitch angle β is out of the first and second angle ranges, it is decided that the image capturing direction is not the virtually vertical direction.

When the image capturing direction is the virtually vertically downward direction, the imaging device 10 calculates the azimuth of the imaging device 10 in the upper surface direction (that is, upper surface azimuth) based on geomagnetism information obtained in S100 and posture information of the imaging device 10 obtained in S104 (S108). Further, the imaging device 10 utilizes the upper surface azimuth (azimuth angle ψ) to record and display azimuth information (S112). For example, the imaging device 10 displays the compass image 312 representing the upper surface azimuth, together with the captured image 310 (through image) on the display unit 130 (see FIG. 13). Further, upon recording of the captured image 310, the imaging device 10 records azimuth information representing the upper surface azimuth as additional information of the captured image 310. Furthermore, upon playback of the captured image 310, the imaging device 10 displays the compass image 316 representing the upper surface azimuth together with the playback image 314, on the display unit 130 based on the azimuth information (see FIG. 14).

Meanwhile, when the image capturing direction is the virtually vertically upward direction, the imaging device 10 calculates the azimuth of the imaging device 10 in the bottom surface azimuth (that is, bottom surface azimuth) based on geomagnetism information obtained in S100 and posture information of the imaging device 10 obtained in S104 (S110). Further, the imaging device 10 uses the bottom surface azimuth to record and display azimuth information (S112). This specific use example is the same as in a case of the upper surface azimuth, and will not be described in detail.

Further, when the image capturing direction is not the virtually vertical direction, the imaging device 10 calculates the azimuth in the image capturing direction (that is, image capturing azimuth) based on geomagnetism information obtained in S100 and posture information of the imaging device 10 obtained in S104 (S114). The image capturing azimuth (azimuth angle θ) is used to record azimuth information (S122). For example, the imaging device 10 records azimuth information representing the image capturing azimuth as additional information of the captured image 300 upon recording of the captured image 300.

Next, the imaging device 10 finds the rotation angle (roll angle α) of the display unit 130 in the roll direction, using the posture information of the imaging device 10 found in S104 (S116). Further, the imaging device 10 converts the image capturing azimuth (azimuth angle θ) calculated in S114 into the display azimuth (azimuth angle φ) based on the roll angle α obtained in S116 (S118). For example, by subtracting or adding the roll angle α from or to the azimuth angle θ of the image capturing azimuth, the azimuth angle φ of the display azimuth is calculated (φ=θ±α).

The display azimuth (azimuth angle φ) is used to display azimuth information (S120). For example, the imaging device 10 displays the compass image 302 representing the display azimuth (azimuth angle φ) together with the captured image 300 (through image), on the display unit 130 (see FIGS. 6 to 8).

As described above, with the azimuth information processing method according to the second embodiment, the azimuth to be displayed and recorded is used separately according to the posture of the imaging device 10. When, for example, the image capturing direction is the virtually vertical direction, the upper surface azimuth or the bottom surface azimuth (azimuth angle ψ) is found, and the upper surface azimuth or the bottom surface azimuth (azimuth ψ) is used to display and record azimuth information. Meanwhile, when the image capturing direction is the virtually vertical direction, the image capturing azimuth (azimuth angle θ) is found and the image capturing azimuth (azimuth angle θ) is corrected by the roll angle α to also find the display azimuth (azimuth angle φ). Further, while the image capturing azimuth (azimuth angle θ) is used to record azimuth information, and the display azimuth (azimuth angle θ) is used to display azimuth information.

4. Conclusion

The imaging device 10 and the azimuth information processing method according to the first and second embodiments of the present invention have been described above. According to the above embodiments, the imaging device 10 calculates the image capturing azimuth (azimuth angle θ) representing an actual image capturing direction, and corrects the image capturing azimuth (azimuth angle θ) according to the change in the posture of the imaging device 10 (the roll angle α of the display unit 130 in the roll direction) and also calculates the display azimuth (azimuth angle φ). Further, while the imaging device 10 uses the image capturing azimuth (azimuth angle θ) for the azimuth to be recorded together with a captured image, the imaging device 10 uses an azimuth (azimuth angle φ) for the azimuth of the compass image 302 to be displayed on the display unit 130 and visually checked by the user.

By this means, when the user performs vertical image capturing using the imaging device 10 upon image capturing, it is possible to display the compass image 302 of the correct azimuth when seen from the user's viewpoint. Further, this compass image 302 does not rotate following rotation of the display unit 130 in the roll direction, and points to a fixed direction at all times when seen from the user's viewpoint. Consequently, irrespectively of rotation in the roll direction, it is possible to display the compass image 302 in a natural display mode when seen from the user's viewpoint. Moreover, upon recording of the captured image 300, it is possible to record the correct image capturing azimuth representing an actual image capturing direction as additional information of the captured image 300. Consequently, it is possible to present both of the playback image 304 and a correct image capturing azimuth of the playback image 304, to the user upon image playback.

Further, according to the second embodiment, the image capturing azimuth, the upper surface azimuth and the bottom surface azimuth are used separately according to the image capturing direction of the imaging device 10 and, only when the image capturing direction is not the virtually vertical direction, the image capturing azimuth and the display azimuth are used. Meanwhile, when the image capturing direction is the virtually vertically downward direction or the virtually vertical information, the upper surface azimuth or the bottom surface azimuth is used and, even when the display unit 130 rotates in the roll direction, the upper surface azimuth or the bottom surface azimuth is not converted according to the roll angle α. Consequently, it is possible to display the compass image 312 representing the upper surface azimuth or the bottom surface azimuth in a natural display mode where the user looks at the compass and, consequently, present azimuth information which the user can intuitively learn.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

10 Imaging device
100 Housing
101 Upper surface
102 Bottom surface
105 Roll axis
106 Pitch axis
107 Yaw axis
110 Image capturing unit
111 Image capturing optical unit
112 Image capturing element
120 Signal processing unit
130 Display unit
140 Recording medium
150 Control unit
151 CPU
160 Operation unit
170 Geomagnetic sensor
172 Acceleration sensor
200 Azimuth calculating unit
202 Azimuth converting unit
204 Compass image generating unit
206 Additional information managing unit
208 Recording unit
210 Playback unit
300, 310 Captured image
302, 306, 312, 316 Compass image
304, 314 Playback image
α Roll angle
β Pitch angle
γ Yaw angle
θ Azimuth angle of image capturing azimuth
φ Azimuth angle of display azimuth
ψ Azimuth angle of upper surface azimuth or bottom surface azimuth

The invention claimed is:

1. A display device comprising:
   circuitry configured to:
   detect a rotation angle of an image capturing direction in a pitch direction based on information detected by a sensor;
   detect whether or not the image capturing direction is in a substantially vertically downward direction based on the rotation angle of the image capturing direction in the pitch direction;
   calculate an upper surface azimuth as being in a direction vertical to the image capturing direction in a case when the image capturing direction is detected in the substantially vertically downward direction;
   control a display of an image corresponding to the upper surface azimuth, instead of an image that is based on the rotation angle of the image capturing direction; and
   control a display of a captured image.

2. The display device according to claim 1, wherein the circuitry is further configured to detect whether or not the image capturing direction is a substantially vertically upward direction based on the rotation angle in the pitch direction, and
   when the image capturing direction is detected in the substantially vertically upward direction, the circuitry is further configured to:
   calculate a bottom surface azimuth as an azimuth that is in the direction vertical to the image capturing direction, and
   control a display of an image representing the bottom surface azimuth.

3. The display device according to claim 1, wherein the circuitry is further configured to:
   associate and record azimuth information representing the upper surface azimuth in the direction vertical to the image capturing direction, with the captured image in a recording medium.

4. The display device according to claim 3, wherein the circuitry is further configured to:
   play back the captured image and the azimuth information recorded in the recording medium, and
   display an image representing an azimuth of the played back azimuth information, and the played back captured image.

5. The display device according to claim 1, wherein the circuitry is further configured to record the captured image.

6. An azimuth information processing method comprising:
   detecting, by a sensor, a rotation angle of an image capturing direction in a pitch direction;
   detecting, by circuitry, whether or not the image capturing direction is in a substantially vertically downward direction based on the rotation angle of the image capturing direction in the pitch direction;
   calculating an upper surface azimuth as being in a direction vertical to the image capturing direction in a case when the image capturing direction is detected in the substantially vertically downward direction;
   controlling a display of an image corresponding to the upper surface azimuth, instead of an image that is based on the rotation angle of the image capturing direction; and
   controlling a display of a captured image.

7. A non-transitory computer readable medium having a computer program recorded thereon, the computer program configured to perform a method when executed on a computer, the method comprising:
- detecting, by a sensor, a rotation angle of an image capturing direction in a pitch direction;
- detecting whether or not the image capturing direction is in a substantially vertically downward direction based on the rotation angle of the image capturing direction in the pitch direction;
- calculating an upper surface azimuth as being in a direction vertical to the image capturing direction in a case when the image capturing direction is detected in the substantially vertically downward direction;
- controlling a display of an image corresponding to the upper surface azimuth, instead of an image that is based on the rotation angle of the image capturing direction; and
- controlling a display of a captured image.

8. A display device comprising:
- circuitry configured to:
  - detect a rotation angle of an image capturing direction in a pitch direction based on information detected by a sensor;
  - detect whether or not the image capturing direction is in a substantially vertically upward direction based on the rotation angle of the image capturing direction in the pitch direction;
  - calculate a bottom surface azimuth as being in a direction vertical to the image capturing direction in a case when the image capturing direction is detected in the substantially vertically upward direction;
  - control a display of an image corresponding to the bottom surface azimuth, instead of an image that is based on the rotation angle of the image capturing direction; and
  - control a display of a captured image.

9. An azimuth information processing method comprising:
- detecting, by a sensor, a rotation angle of an image capturing direction in a pitch direction;
- detecting, by circuitry, whether or not the image capturing direction is in a substantially vertically upward direction based on the rotation angle of the image capturing direction in the pitch direction;
- calculating a bottom surface azimuth as being in a direction vertical to the image capturing direction in a case when the image capturing direction is detected in the substantially vertically upward vertical direction;
- controlling a display of an image corresponding to the bottom surface azimuth, instead of an image that is based on the rotation angle of the image capturing direction; and
- controlling a display of a captured image.

10. A non-transitory computer readable medium having a computer program recorded thereon, the computer program configured to perform a method when executed on a computer, the method comprising:
- detecting, by a sensor, a rotation angle of an image capturing direction in a pitch direction;
- detecting whether or not the image capturing direction is in a substantially vertically upward direction based on the rotation angle of the image capturing direction in the pitch direction;
- calculating a bottom surface azimuth as being in a direction vertical to the image capturing direction in a case when the image capturing direction is detected in the substantially vertically upward direction;
- controlling a display of an image corresponding to the bottom surface azimuth, instead of an image that is based on the rotation angle of the image capturing direction; and
- controlling a display of a captured image.

* * * * *